US012700907B2

(12) United States Patent
Abotabl et al.

(10) Patent No.: US 12,700,907 B2
(45) Date of Patent: Aug. 4, 2026

(54) CHANNEL MEASUREMENT AND REPORTING FOR FULL-DUPLEX OPERATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Kiran Krishna Mukkavilli, San Diego, CA (US); Tingfang Ji, San Diego, CA (US); Huilin Xu, Temecula, CA (US); Wanshi Chen, San Diego, CA (US); Hung Dinh Ly, San Diego, CA (US); Alexandros Manolakos, Escondido, CA (US); Naga Bhushan, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 708 days.

(21) Appl. No.: 17/756,311

(22) PCT Filed: Dec. 21, 2020

(86) PCT No.: PCT/US2020/066486
§ 371 (c)(1),
(2) Date: May 20, 2022

(87) PCT Pub. No.: WO2021/138128
PCT Pub. Date: Jul. 8, 2021

(65) Prior Publication Data
US 2022/0416867 A1     Dec. 29, 2022

(30) Foreign Application Priority Data

Dec. 30, 2019     (GR) .............................. 20190100582

(51) Int. Cl.
| | |
|---|---|
| *H04B 7/06* | (2006.01) |
| *H04W 24/08* | (2009.01) |
| *H04W 24/10* | (2009.01) |

(52) U.S. Cl.
CPC ......... H04B 7/0632 (2013.01); H04B 7/0626 (2013.01); H04W 24/08 (2013.01); H04W 24/10 (2013.01)

(58) Field of Classification Search
CPC ................................................... H04B 7/0632
See application file for complete search history.

(56) References Cited

U.S. PATENT DOCUMENTS

| | | | |
|---|---|---|---|
| 9,198,071 B2 | 11/2015 | Geirhofer et al. | |
| 2012/0034926 A1* | 2/2012 | Damnjanovic | H04W 72/541 |
| | | | 455/501 |

(Continued)

FOREIGN PATENT DOCUMENTS

| | | |
|---|---|---|
| CN | 110418380 A | 11/2019 |
| WO | 2013142089 | 9/2013 |

OTHER PUBLICATIONS

Hesham E., et al., "Interference Measurement Methods in 5G NR: Principles and Performance", 2019 16th International Symposium on Wireless Communication Systems (ISWCS), IEEE, Aug. 27, 2019 (Aug. 27, 2019), 7 Pages, XP033636294, DOI: 10.1109/ISWCS.2019.8877215, [retrieved on Oct. 18, 2019], Abstract, Section II.A.

(Continued)

*Primary Examiner* — Abdeltif Ajid
(74) *Attorney, Agent, or Firm* — Arent Fox LLP/Qualcomm incorporated

(57) ABSTRACT

This disclosure provides systems, devices, apparatus and methods, including computer programs encoded on storage media, for channel measurement and reporting by a FD UE. A user equipment (UE) may be configured to transmit an (Continued)

uplink (UL) signal in a set of UL resources configured with a base station. The UE may be further configured to monitor a set of downlink (DL) resources configured with the base station, the set of DL resources being adjacent to or at least partially overlapping with the set of UL resources. The UE may be further configure to determine a channel quality associated with the set of DL resources based on the UL signal transmitted in the set of UL resources. The UE may be configured to then transmit, to the base station, information indicating channel state feedback (CSF) based on the determined channel quality.

28 Claims, 14 Drawing Sheets

(56) References Cited

U.S. PATENT DOCUMENTS

| | | | |
|---|---|---|---|
| 2013/0273954 A1* | 10/2013 | Ji | H04L 5/0057 |
| | | | 455/509 |
| 2014/0328228 A1 | 11/2014 | Park et al. | |
| 2015/0078177 A1* | 3/2015 | Buckley | H04W 72/541 |
| | | | 370/252 |
| 2017/0222696 A1* | 8/2017 | Ji | H04L 5/0051 |
| 2018/0139795 A1* | 5/2018 | Zeung | H04W 76/14 |
| 2018/0287739 A1* | 10/2018 | Kim | H04J 11/0023 |
| 2019/0327755 A1 | 10/2019 | Xiong et al. | |
| 2020/0120683 A1* | 4/2020 | Kakishima | H04L 25/0226 |
| 2020/0220585 A1* | 7/2020 | John Wilson | H04L 5/0053 |
| 2020/0252950 A1* | 8/2020 | Yang | H04W 72/54 |
| 2020/0288412 A1* | 9/2020 | Ajdakple | H04W 52/365 |
| 2020/0313824 A1* | 10/2020 | Barbu | H04L 5/001 |
| 2021/0194663 A1* | 6/2021 | Abotabl | H04L 5/0073 |
| 2021/0258100 A1* | 8/2021 | Hassan Hussein | |
| | | | H04W 72/0453 |
| 2022/0014337 A1* | 1/2022 | Ouchi | H04W 74/0808 |

OTHER PUBLICATIONS

Huawei., et al., "Advanced CSI Feedback Framework for LTE", 3GPP TSG RAN WG1 Meeting #86, 3GPP Draft; R1-166139, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), 7 Pages, XP051125234, Retrieved from the Internet: URL: https://www.3gpp.org/ftp/tsg_ran/WG1_RL1/TSGR1_86/Docs/R1-166139.zip [retrieved on Aug. 21, 2016], Section 2.3, Section 3.2, Section 4.
International Search Report and Written Opinion—PCT/US2020/066486—ISA/EPO—Apr. 13, 2021.
"3rd Generation Partnership Project; Technical Specification Group Radio Access Network; NR; Physical layer procedures for data (Release 15", 3GPP TS 38.214, 15.2.0, Jun. 2018, Jul. 31, 2018, 95 Pages.

* cited by examiner

CSF that is based on channel quality associated with a set of DL resources — the channel quality being determined based on an UL signal transmitted in a set of UL resources that is adjacent to or at least partially overlapping with the set of DL resources

900

| Sub-band differential CQI value | Offset level |
|---|---|
| 0 | 0 |
| 1 | >=1 |
| 2 | -1 |
| 3 | <=-2 |

| Sub-band differential CQI value | Offset level |
|---|---|
| 0 | 0 |
| 1 | 1 |
| 2 | 2 |
| 3 | >=3 |
| 4 | -1 |
| 5 | -2 |
| 6 | -3 |
| 7 | <=-4 |

FIG. 9B

1102 determine that an UL signal to be transmitted to a first BS will be concurrent with a DL signal based on which at least one RLM and/or RRM measurement(s) will be performed

1104 refrain from transmitting in UL to the first BS while receiving a DL signal in the DL

1106 receive a configuration from a second BS to perform the at least one of the RLM and/or RRM measurement while in a HD mode

1108 perform the at least one of the RLM and/or RRM measurement based on receiving a DL signal

1110 transmit a report indicating at least one result of the RLM and/or RRM measurement(s)

1112 transmit information indicating that the at least one of the RLM and/or RRM measurement(s) associated with the report was performed while in the HD mode

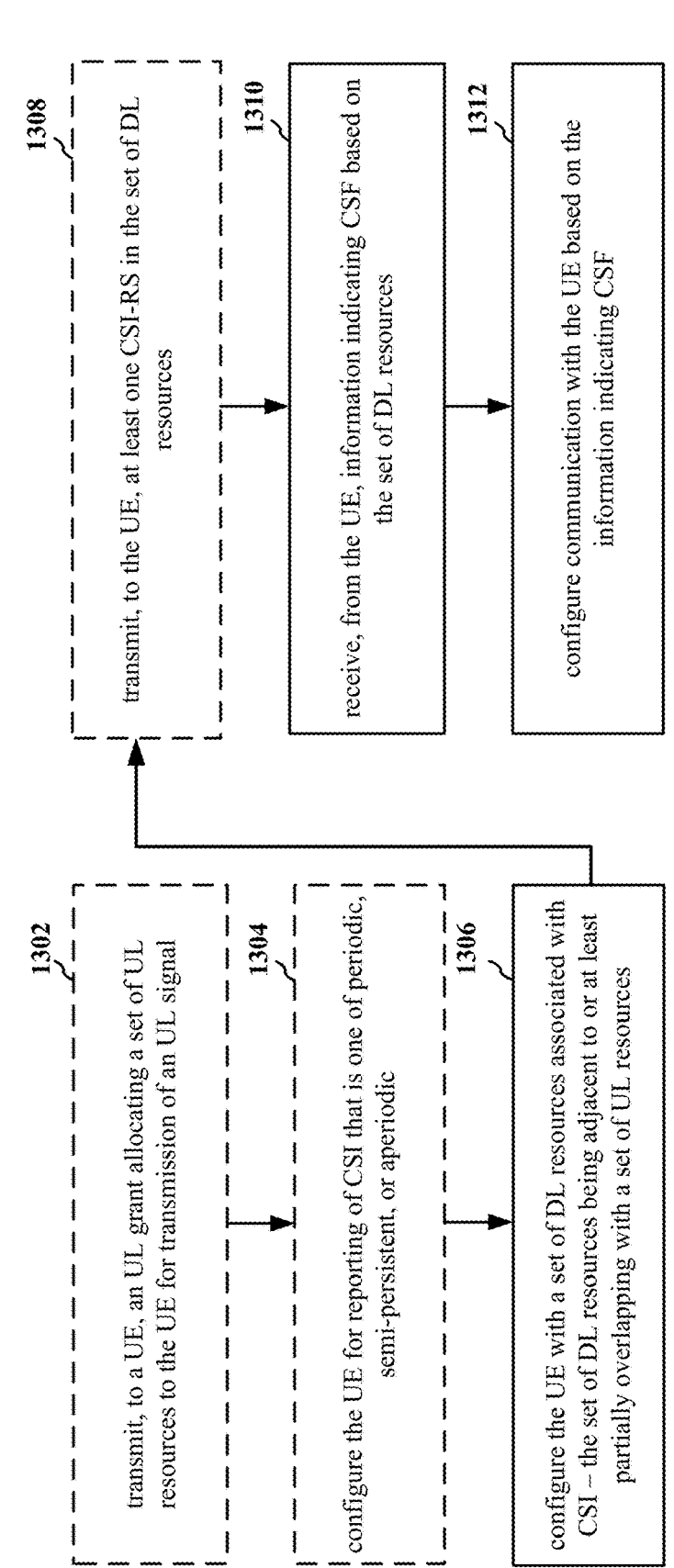

1300

1302  transmit, to a UE, an UL grant allocating a set of UL resources to the UE for transmission of an UL signal 1304  configure the UE for reporting of CSI that is one of periodic, semi-persistent, or aperiodic 1306  configure the UE with a set of DL resources associated with CSI – the set of DL resources being adjacent to or at least partially overlapping with a set of UL resources 1308  transmit, to the UE, at least one CSI-RS in the set of DL resources 1310  receive, from the UE, information indicating CSF based on the set of DL resources 1312  configure communication with the UE based on the information indicating CSF

FIG. 13

CHANNEL MEASUREMENT AND REPORTING FOR FULL-DUPLEX OPERATION

CROSS REFERENCE TO RELATED APPLICATION(S)

This application is a National Phase entry of PCT Application No. PCT/US2020/066486, entitled "CHANNEL MEASUREMENT AND REPORTING FOR FULL-DU-PLEX OPERATION" and filed on Dec. 21, 2020, which claims priority of Greek application No. 20190100582, entitled "CHANNEL MEASUREMENT AND REPORT-ING FOR FULL-DUPLEX USER EQUIPMENT" and filed on Dec. 30, 2019, both of which are expressly incorporated by reference herein in their entirety.

BACKGROUND

Technical Field

The present disclosure relates generally to communica-tion systems, and more particularly, to full duplex (FD) channel measurement and reporting.

Introduction

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division mul-tiple access (FDMA) systems, orthogonal frequency divi-sion multiple access (OFDMA) systems, single-carrier fre-quency division multiple access (SC-FDMA) systems, and time division synchronous code division multiple access (TD-SCDMA) systems.

These multiple access technologies have been adopted in various telecommunication standards to provide a common protocol that enables different wireless devices to commu-nicate on a municipal, national, regional, and even global level. An example telecommunication standard is 5G New Radio (NR). 5G NR is part of a continuous mobile broad-band evolution promulgated by Third Generation Partner-ship Project (3GPP) to meet new requirements associated with latency, reliability, security, scalability (e.g., with Inter-net of Things (IoT)), and other requirements. 5G NR includes services associated with enhanced mobile broad-band (eMBB), massive machine type communications (mMTC), and ultra reliable low latency communications (URLLC). Some aspects of 5G NR may be based on the 4G Long Term Evolution (LTE) standard. Further improve-ments in 5G NR technology continue to be useful. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Full duplex (FD) communication is a wireless communi-cation method that supports simultaneous transmission and reception of information over the same frequency band. In this manner, spectral efficiency can be improved over half-duplex (HD) communication, which only supports transmis-sion/reception of information in one direction at a time.

Given the concurrent or simultaneous nature of FD com-munication, transmission of an uplink (UL) signal from a user equipment (UE) that is concurrent with reception of a downlink (DL) signal from a base station (BS) may affect the channel quality, specifically on the channel between the BS and the UE. For example, uplink communication from the UE to the BS may degrade (e.g., introduce interference) to downlink communication to the UE from the BS, or vice versa.

Thus, measurements and/or other information related to channel quality may be different when the BS and the UE use FD communication, e.g., relative to HD communication. In order to suitably configure the UE and the BS, for FD communication, information related to channel quality that is applicable to FD communication may be used.

However, such information may be difficult and/or time-consuming to obtain. Therefore, a need exists for obtaining measurements and/or other information related to channel quality when the BS and the UE are using FD communica-tion.

In view of the foregoing, the present disclosure describes various systems, devices, apparatuses, methods, and com-puter programs (e.g., encoded on storage media and/or to configure at least one processor) that determine channel measurements and report information associated therewith by a UE configured for FD communication. An UL signal—e.g., a sounding reference signal (RS) (SRS), control infor-mation within a scheduled physical uplink control channel (PUCCH), data within a scheduled physical uplink shared channel (PUSCH), and/or other uplink signal—may be transmitted in UL resources from the UE to a BS. Concur-rently with transmitting the UL signal in the UL resources, the UE may determine channel quality information in DL resources configured by the BS. The channel quality infor-mation, for example, may include at least one of measure-ment(s) of energy and/or signal strength, value(s) indicative of channel quality, channel state information (CSI), and other such information/values.

For example, the UE may transmit an UL signal in UL resources concurrently with receiving a DL signal in DL resources from the BS—e.g., the DL signal may include a CSI-RS. In another example, the UE may transmit an UL signal in UL resources concurrently with detecting or mea-suring energy or interference in DL resources—e.g., the DL resources may include CSI interference measurement (IM) resources, which may be configured by the BS for the UE. Thus, the UE may determine channel quality information in DL resources configured by the BS while concurrently transmitting an UL signal in UL resources.

In some aspects, the DL resources may be adjacent to the UL resources or at least partially overlapping with the UL resources. For example, the UL resources and the DL resources may be sub-band frequency division duplex (FDD) resources (also referred to as flexible FDD) or in-band full duplex (IBFD) resources.

In effect, the UE may determine the at least one channel measurement and/or channel quality in DL resources in the presence of UL transmission, e.g., such that the UL transmission functions as interference on the DL resources. From the DL signal, the UE may measure and/or determine at least one value or other information indicative of channel quality, which may include value(s) and/or information related to signal strength, signal quality, interference measurement(s), CSI, and the like. In particular, the UE may generate channel state feedback (CSF), which may include measurement(s) and/or information associated with the channel quality. For example, the CSF may include at least one of a channel quality indicator (CQI), a rank indicator (RI), a precoding matrix indicator (PMI), CSI, and/or other value(s) or information associated with the quality of the channel between the UE and the BS. The UE may then transmit information to the BS based on the determined channel quality—specifically, the transmitted information may include the CSF.

In a first aspect of the disclosure, a first method, a first computer-readable medium, and a first apparatus are provided for wireless communication. The first apparatus may be a UE or a wireless device at a UE. The first apparatus may transmit an UL signal in a set of UL resources configured with a BS. The first apparatus may further monitor a set of DL resources configured with the BS, and the set of DL resources may be adjacent to or at least partially overlapping with the set of UL resources. The first apparatus may determine a channel quality associated with the set of DL resources based on the UL signal transmitted in the set of UL resources. The first apparatus may additionally transmit, to the BS, information indicating CSF based on the determined channel quality.

In a second aspect of the disclosure, a second method, a second computer-readable medium, and a second apparatus are provided for wireless communication. The second apparatus may be a BS or a wireless device at a BS. The second apparatus may configure a UE with a set of DL resources associated with CSI, and the set of DL resources may be adjacent to or at least partially overlapping with a set of UL resources. The second apparatus may further receive, from the UE, information indicating CSF based on the set of DL resources. The second apparatus may then configure FD communication with the UE based on the information indicating CSF.

In third aspect of the disclosure, a third method, a third computer-readable medium, and a third apparatus are provided for wireless communication. The third apparatus may be a UE or a wireless device at a UE. The third apparatus may determine that an UL transmission to a first BS will be concurrent with a DL reception on which at least one of a radio link monitoring (RLM) measurement or a radio resource management (RRM) measurement will be performed. In such instances, the third apparatus may refrain from causing UL signals to be transmitted to the first BS while a DL signal in the DL is concurrently being received. Upon performing the at least one of the RLM measurement or the RRM measurement based on the received DL signal, the third apparatus may further transmit a report indicating the at least one of the RLM measurement results or the RRM measurement results.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 9A and 9B are diagrams illustrating example channel quality indicator (CQI) offset tables, in accordance with various aspects of the present disclosure.

FIG. 11 is a flowchart illustrating another example method of wireless communication by a UE, in accordance with various aspects of the present disclosure.

FIG. 13 is a flowchart illustrating an example method of wireless communication by a BS, in accordance with various aspects of the present disclosure.

DETAILED DESCRIPTION

Figure 1:
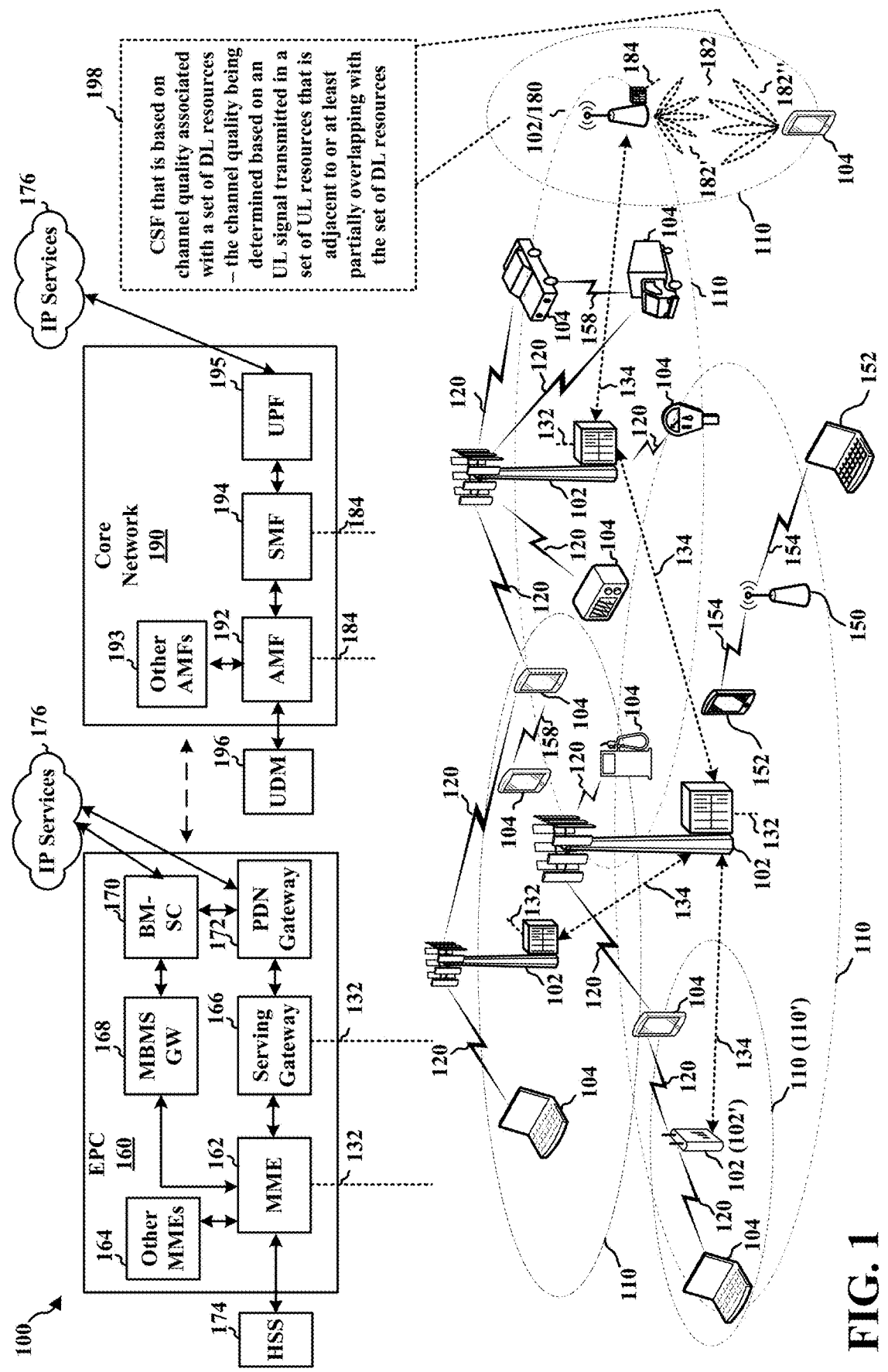
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations (BSs) 102, UEs 104, an Evolved Packet Core (EPC) 160, and another core network 190 (e.g., a 5G Core (5GC)). The BSs 102 may include macrocells (high power cellular BS) and/or small cells (low power cellular BS). The macrocells include BSs. The small cells include femtocells, picocells, and microcells.

The BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The BSs 102 configured for 5G NR (collectively referred to as Next Generation RAN (NG-RAN)) may interface with core network 190 through second backhaul links 184. In addition to other functions, the BSs 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BSs 102 may communicate directly or indirectly (e.g., through the EPC 160 or core network 190) with each other over third backhaul links 134 (e.g., X2 interface). The third backhaul links 134 may be wired or wireless.

The BSs 102 may wirelessly communicate with the UEs 104. Each of the BSs 102 may provide communication coverage for a respective geographic coverage area 110. There may be overlapping geographic coverage areas 110. For example, the small cell 102' may have a coverage area 110' that overlaps the coverage area 110 of one or more macro BSs 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the BSs 102 and the UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity. The communication links may be via one or more carriers. The BSs 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to the DL and the UL (e.g., more or fewer carriers may be allocated for the DL than for the UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A BS 102, whether a small cell 102' or a large cell (e.g., macro BS), may include and/or be referred to as an eNB, gNodeB (gNB), or another type of BS. Some BSs, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW BS. Extremely high frequency (EHF) is part of the radio frequency (RF) spectrum in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW BS 180 may utilize beamforming 182 with the UE 104 to compensate for the extremely high path loss and short range. The BS 180 and the UE 104 may each include a plurality of antennas, such as antenna elements, antenna panels, and/or antenna arrays to facilitate the beamforming.

The BS 180 may transmit a beamformed signal to the UE 104 in one or more transmit directions 182'. The UE 104 may receive the beamformed signal from the BS 180 in one or more receive directions 182". The UE 104 may also transmit a beamformed signal to the BS 180 in one or more transmit directions. The BS 180 may receive the beamformed signal from the UE 104 in one or more receive directions. The BS 180/UE 104 may perform beam training to determine the best receive and transmit directions for each of the BS 180/UE 104. The transmit and receive directions for the BS 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets may be transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets may be transferred through the UPF 195. The UPF 195 provides UE IP address allocation as well as other functions. The UPF 195 is connected to the IP Services 176. The IP Services 176 may include the Internet, an intranet, an IP Multimedia Subsystem (IMS), a PS Streaming Service, and/or other IP services.

The BS may include and/or be referred to as a gNB, Node B, eNB, an access point, a base transceiver station, a radio BS, a radio transceiver, a transceiver function, a basic service set (BSS), an extended service set (ESS), a transmit reception point (TRP), or some other suitable terminology. The BS 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the BS 102/180 may configure the UE 104 with a set of DL resources and/or a set of UL resources—e.g., the UE 104 may be configured with a bandwidth over which to communicate with the BS 102/180. The bandwidth may be configured for full duplex (FD) communication. FD communication is a wireless communication method that supports simultaneous transmission and reception of information over the same frequency band. In this manner, spectral efficiency can be improved over half-duplex (HD) communication, which only supports transmission/reception of information in one direction at a time.

For example, the bandwidth may be configured for in-band FD (IBFD) operation in which uplink and downlink resources share the same IBFD time/frequency resource(s) (e.g., the UL resources may be partially or fully overlapping with DL resources). Thus, the UE 104 and the BS 102/180 may each transmit and receive on the time/frequency resource(s).

In another example, the bandwidth may be configured for flexible duplex or flexible frequency division duplexed (FDD), which may also be referred to as sub-band FDD. With flexible FDD, the uplink and downlink resources share the same time resource(s) (e.g., the UL resources may be fully overlapping with DL resources in the time domain), but are adjacent in the frequency domain. That is, the uplink and downlink resources may not overlap in the frequency domain, but instead may be configured to be adjacent to one another, e.g., the uplink resources are separated from the downlink resources by a guard band, such that the uplink and downlink resources are non-contiguous in the frequency domain. Thus, the UE 104 and the BS 102/180 may each transmit and receive on the time resource(s) but different frequency resources.

In various aspects, the BS 102/180 may configure the UE 104 with a set of DL resources associated with channel state information (CSI). The set of DL resources configured with a set of UL resources for IBFD or flexible FDD operation— e.g., the set of DL resources may at least partially overlap with the set of UL resources in the time domain, and the set of DL resources may be adjacent to or at least partially overlapping with a set of UL resources in the frequency domain.

The UE 104 may be configured to transmit an UL signal in the UL resources, e.g., to the BS 102/180. In some instances, the BS 102/180 may receive the UL signal from the UE 104 in the UL resources. The UE 104 may further monitor the set of DL resources, e.g., as configured by the BS 102/180. As the UL and DL resources may at least partially overlap in time, the UL signal may also be in, or may overlap in time with, the set of DL resources.

The UE 104 may then determine a channel quality associated with the set of DL resources based on the UL signal transmitted in the set of UL resources. In one aspect, the BS 102/180 may configure the set of DL resources as CSI interference measurement (IM) resources, and so the UE 104 may determine the channel quality by measuring energy (e.g., interference or other signal strength) in the CSI-IM resources (i.e., the set of DL resources in this aspect).

In another aspect, the BS 102/180 may transmit at least one CSI reference signal (RS) in the set of DL resources. Accordingly, the UE 104 may receive the at least one CSI-RS and may determine a channel quality (e.g., CSI or other channel quality information/value) based on receiving the at least one CSI-RS. As the at least one CSI-RS may be received in the set of DL resources that overlap at least in time with the UL resources in which the UL signal is transmitted, the channel quality determined by the UE 104 may be affected by (e.g., interfered with) by the UL signal in the set of UL resources.

Subsequently, the UE 104 may determine channel state feedback (CSF) that is based on the channel quality associated with the set of DL resources, with the channel quality being determined based on the UL signal transmitted in the set of UL resources that is adjacent to or at least partially overlapping with the set of DL resources (198). The UE 104 may transmit information indicating the CSF to the BS 102/180 based on the determined channel quality.

Correspondingly, the BS 102/180 may receive, from the UE 104, the information indicating the CSF that is based on the channel quality associated with the set of DL resources, with the channel quality being determined based on the UL signal transmitted in the set of UL resources that is adjacent to or at least partially overlapping with the set of DL resources (198).

Various aspects and other details related to FD communication by UEs and BSs based on CSF determined by UEs are further described herein.

Figures 2A, 2B, 2C, 2D:
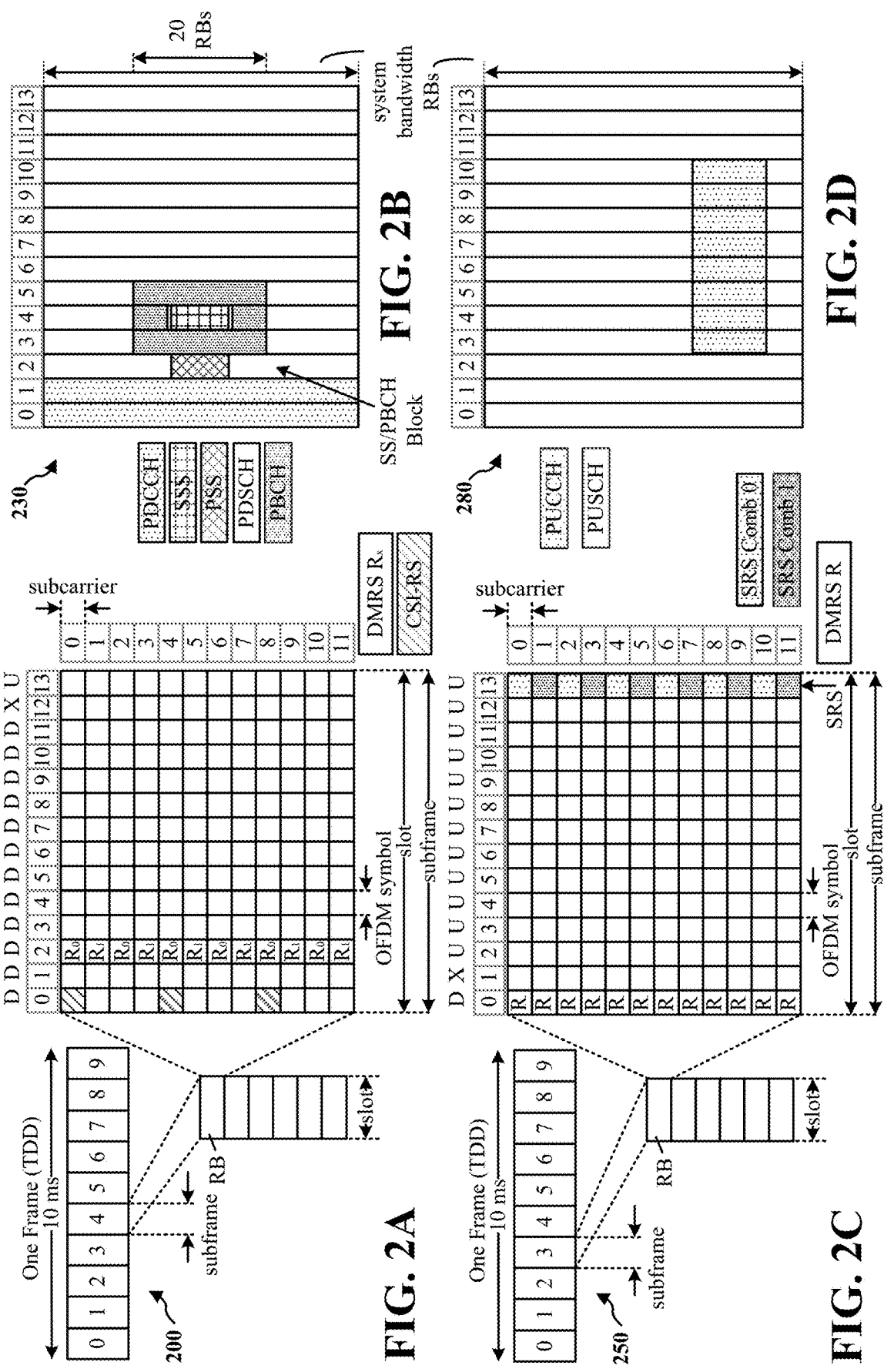
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on the DL may be cyclic prefix (CP) OFDM (CP-OFDM) symbols. The symbols on the UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The sub-carrier spacing and symbol length/duration are a function of the numerology. The subcarrier spacing may be equal to $2^\mu*15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 μs.

A resource grid may be used to represent the frame structure. Each time slot includes a resource block (RB) (also referred to as a physical RB (PRB)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as RX for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the BS. The UE may transmit DM-RS for the PUCCH and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit a SRS. The SRS may be transmitted in the last symbol of a subframe. The SRS may have a comb structure, and a UE may transmit SRS on one of the combs. The SRS may be used by a BS for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a CQI, a PMI, a RI, and hybrid automatic repeat request (HARQ) ACK/NACK feedback. The PUSCH carries data, and may additionally be used to carry a buffer status report (BSR), a power headroom report (PHR), and/or UCI.

Figure 3:
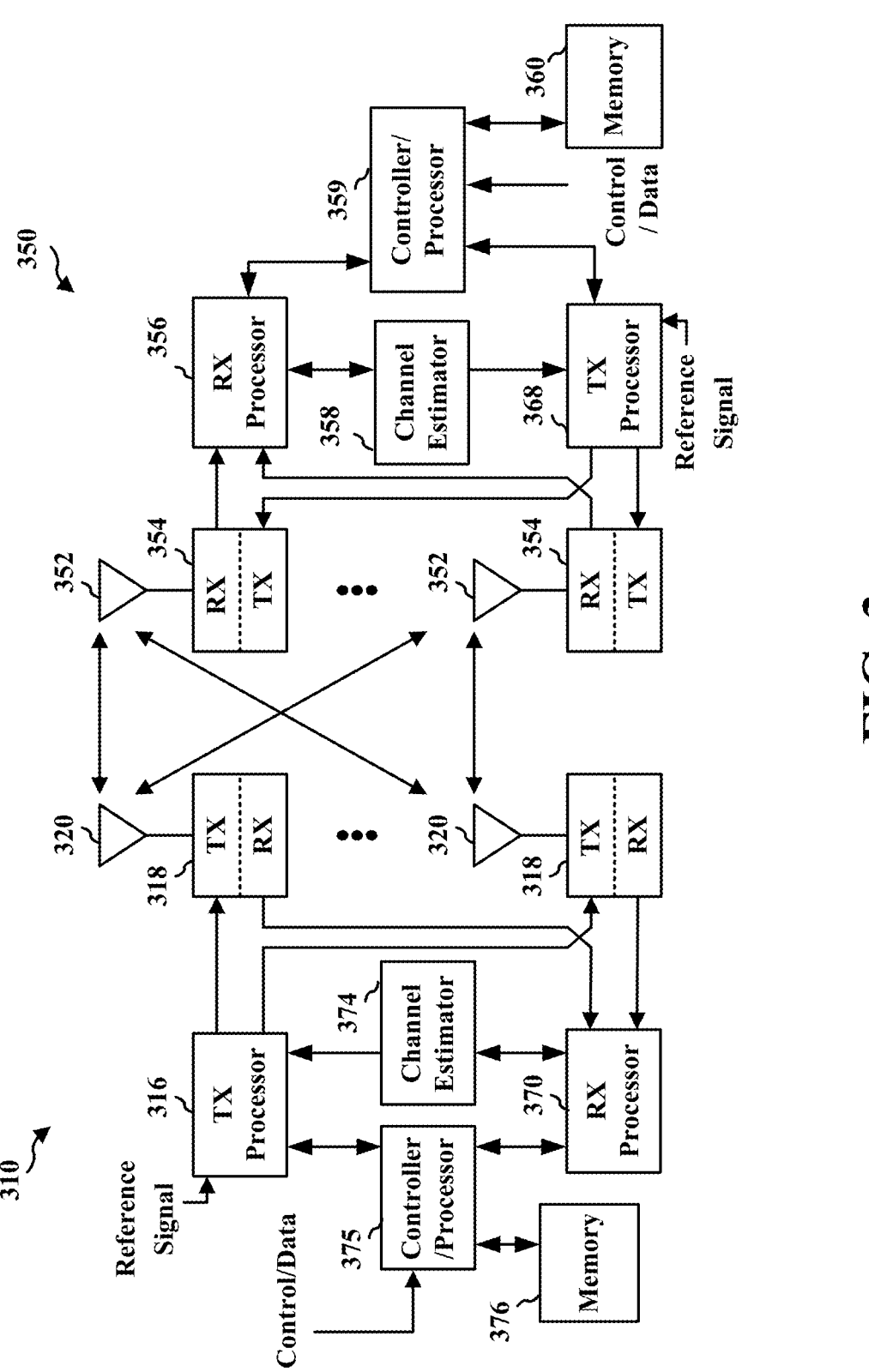
FIG. 3 is a diagram illustrating an example of a base station (BS) and a user equipment (UE) in an access network, in accordance with various aspects of the present disclosure.

FIG. 3 is a block diagram of a BS 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the BS 310. These soft decisions may be based on channel estimates computed by the channel estimator 358. The soft decisions are then decoded and deinterleaved to recover the data and control signals that were originally transmitted by the BS 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the BS 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the BS 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the BS 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with (198) of FIG. 1.

In some other aspects, at least one of the TX processor 316, the RX processor 370, and the controller/processor 375 may be configured to perform aspects in connection with (198) of FIG. 1.

Referring to FIGS. 4 through 14, various aspects related to determining, transmitting, and applying CSF for FD communication are described. FD is a wireless communication method that supports simultaneous transmission and reception of information over the same frequency band. In this manner, spectral efficiency can be improved over half-duplex (HD) communication, which only supports transmission/reception of information in one direction at a time.

Given the concurrent or simultaneous nature of FD communication, transmission of an UL signal from a UE that is concurrent with reception of a DL signal from a BS may affect the channel quality, specifically on the channel between the BS and the UE. For example, uplink communication from the UE to the BS may degrade (e.g., introduce interference) to downlink communication to the UE from the BS, or vice versa.

Thus, measurements and/or other information related to channel quality may be different when the BS and the UE use FD communication, e.g., relative to HD communication. In order to suitably configure the UE and the BS, for FD communication, information related to channel quality that is applicable to FD communication may be used.

However, such information may be difficult and/or time-consuming to obtain. Therefore, a need exists for obtaining measurements and/or other information related to channel quality when the BS and the UE are using FD communication.

In view of the foregoing, the present disclosure describes various systems, devices, apparatuses, methods, and computer programs (e.g., encoded on storage media and/or to configure at least one processor) that determine channel measurements and report information associated therewith by a UE configured for FD communication. An UL signal— e.g., an SRS), control information within a scheduled PUCCH, data within a scheduled PUSCH, and/or other uplink signal—may be transmitted in UL resources from the UE to a BS. Concurrently with transmitting the UL signal in the UL resources, the UE may determine channel quality information in DL resources configured by the BS. The channel quality information, for example, may include at least one of measurement(s) of energy and/or signal strength, value(s) indicative of channel quality, CSI, and other such information/values.

For example, the UE may transmit an UL signal in UL resources concurrently with receiving a DL signal in DL resources from the BS—e.g., the DL signal may include a CSI-RS. In another example, the UE may transmit an UL signal in UL resources concurrently with detecting or measuring energy or interference in DL resources—e.g., the DL resources may include CSI-IM resources, which may be configured by the BS for the UE. Thus, the UE may determine channel quality information in DL resources configured by the BS while concurrently transmitting an UL signal in UL resources.

In some aspects, the DL resources may be adjacent to the UL resources or at least partially overlapping with the UL resources. For example, the UL resources and the DL resources may be FD resources, such as flexible FDD resources or IBFD resources. For IBFD, the UL resources may be at least partially overlapping with the DL resources in the frequency domain. That is, at least some of the UL and DL resources may be configured on the same frequency spectrum (e.g., as least some subcarriers may be shared by the UL and DL resources).

For flexible FDD, however, the UL resources may be adjacent to the DL resources in the frequency domain. In other words, the UL resources may be configured on a different frequency spectrum than the DL resources (e.g., the UL resources may have no subcarriers in common with the DL resources). Potentially, a guard band may be configured between the UL and the DL resources—e.g., the guard band may include a portion of the frequency spectrum that is unused by either the UL or the DL resources.

FD resources may at least partially overlap in time, regardless of whether the UL and DL resources are flexible FDD or IBFD. Therefore, UL signals in UL resources that at least partially overlap with DL resources may be concurrent or simultaneous with DL signals in those DL resources.

As used in the present disclosure in the context of resources and/or communications, "concurrent" or "simultaneous" may refer to resources that are at least partially overlapping in time. Illustratively, an UL signal in UL resources may be concurrent with a DL signal in DL resources when one or more of the UL resources carrying the UL signal at least partially overlaps in time with one or more of the DL resources carrying the DL signal, even if the time boundaries of the UL and DL resources are unsynchronized or not aligned. For example, an UL symbol may occur at the same point in time as a DL symbol, and so an UL signal in the UL symbol may be concurrent or simultaneous with a DL signal in the DL symbol.

In effect, the UE may determine the at least one channel measurement and/or channel quality in DL resources in the presence of UL transmission, e.g., such that the UL transmission functions as interference on the DL resources. From the DL signal, the UE may measure and/or determine at least one value or other information indicative of channel quality, which may include value(s) and/or information related to signal strength, signal quality, interference measurement(s), CSI, and the like. In particular, the UE may generate CSF, which may include measurement(s) and/or information associated with the channel quality. For example, the CSF may include at least one of a CQI, an RI, a PMI, CSI, and/or other value(s) or information associated with the quality of the channel between the UE and the BS. The UE may then transmit information to the BS based on the determined channel quality—specifically, the transmitted information may include the CSF.

In some aspects, CSF may be based on (e.g., may include) CSI. The CSI, however, may be determined (e.g., calculated, measured, etc.) at a receiver side (e.g., at a UE). Therefore, the CSF may include a mechanism for conveying channel quality, channel characteristics, and/or other related information that is observed at the receiver side to the transmitter side (e.g., the BS). Thus, the CSF may include CSI, such as PMI, RI, and/or CQI, and/or the CSF may include CSI applicable to the transmitter side.

Figures 4A, 4B, 4C:
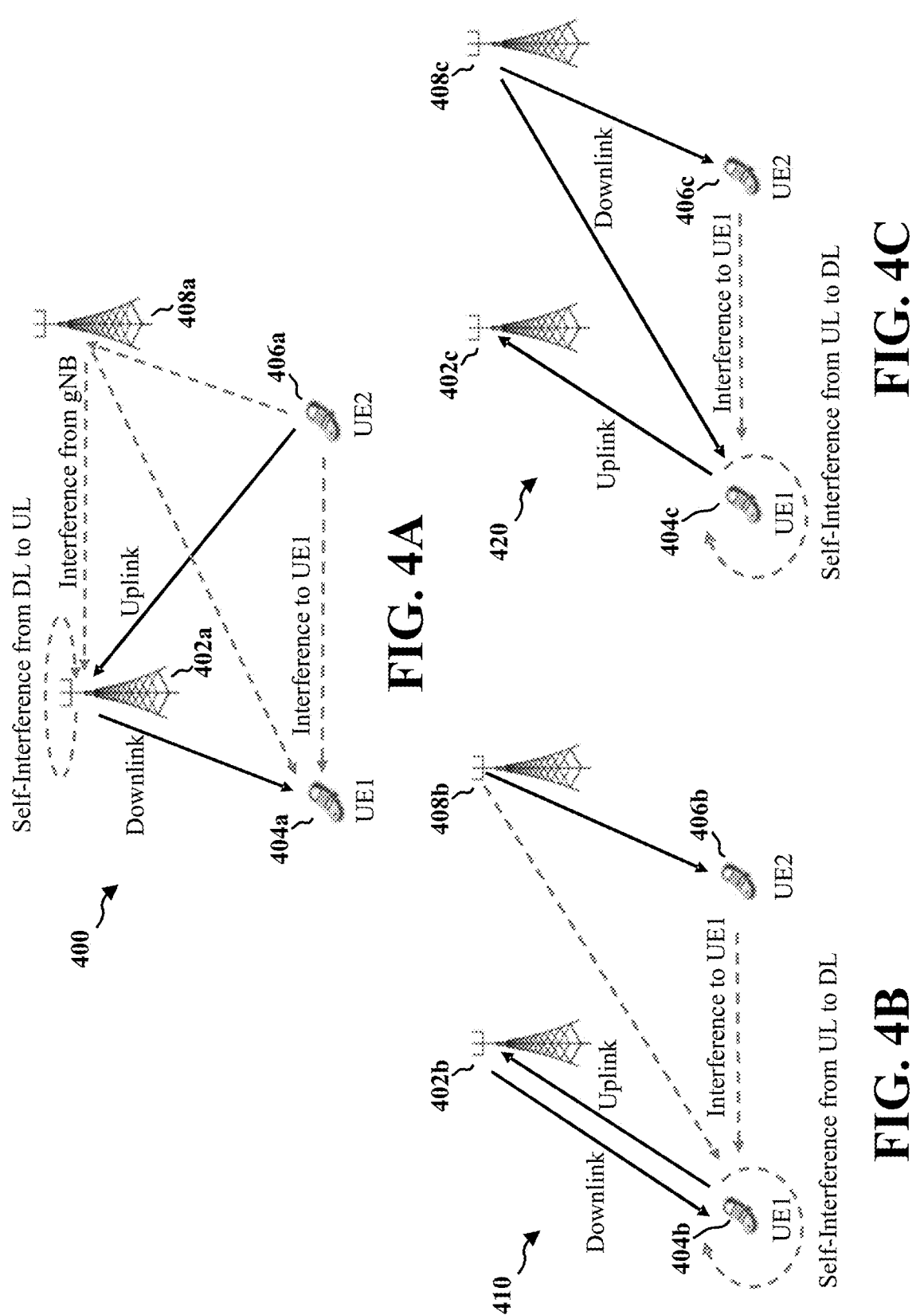
FIGS. 4A, 4B, and 4C are diagrams illustrating examples modes of full duplex (FD) communication, in accordance with various aspects of the present disclosure.

FIGS. 4A-4C illustrate various modes of FD communication. FD communication is a wireless communication method that supports simultaneous transmission and reception of information over a same frequency band. In this manner, spectral efficiency may be improved with respect to the spectral efficiency of HD communication, which only supports transmission or reception of information in one direction at a time. Due to the simultaneous TX/RX nature of FD communication, a UE or a BS may experience self-interference caused by signal leakage from its local transmitter to its local receiver. In addition, the UE or BS may also experience interference from other devices, such as transmissions from a second UE or a second BS. Such interference (e.g., self-interference or interference caused by other devices) may impact a quality of information communicated via the signal, or even lead to a loss of the information.

FIG. 4A shows a first configuration 400 in which a first BS 402a is in communication with a first UE 404a and a second UE 406a. The first BS 402a is a FD BS, whereas the first UE 404a and the second UE 406a may be configured as either a HD UE or a FD UE. The second UE 406a may transmit a first signal in UL resources to the first BS 402a as well as to other BSs, such as a second BS 408a in proximity to the second UE 406a. The first BS 402a and the second BS 408a may be configured as an eNB, a gNB, a mmW BS, a small cell, and/or another BS.

In FIG. 4A, the first BS 402a transmits a second signal in DL resources to the first UE 404a concurrently with receiving the first signal in UL resources from the second UE 406a. Accordingly, self-interference may occur at the first BS 402a as a result of the second signal and the first signal being communicated concurrently. Further interference may occur at the first BS 402a via signals emitted from the second BS 408a. Interference may also occur at the first UE 404a based on such signals emitted from the second BS 408a as well as from UE-based signals emitted by the second UE 406a.

FIG. 4B shows a second configuration 410 in which a first BS 402b is in communication with a first UE 404b. The first BS 402b is a FD BS and the first UE 404b is a FD UE. That is, the first BS 402b can receive a first signal in UL resources from the first UE 404b concurrently with transmitting a second signal in DL resources to the first UE 404b; and the first UE 404b can receive the second signal in DL resources from the first BS 402b concurrently with transmitting the first signal in UL resources to the first BS 402b. Accordingly, self-interference may occur at either or both of the first BS 402b and/or the first UE 404b as a result of the first signal and the second signal being simultaneously communicated between the first BS 402b and the first UE 404b. Further interference may also occur at the first UE 404b based on one or more signals emitted from a second UE 406b and/or a second BS 408b in proximity to the first UE 404b. The first BS 402b and the second BS 408b can be configured as either an eNB or a gNB.

FIG. 4C shows a third configuration 420 in which a first UE 404c is in communication with a first BS 402c and a second BS 408c. The first UE 404c is a FD UE for which the first BS 402c and the second BS 408c serve as multiple transmission and reception points (multi-TRPs) for UL and DL resources. In an example, the second BS 408c may be in communication with a second UE 406c and transmit further DL resources thereto. In FIG. 4C, the first UE 404c is configured to transmit an a first signal in UL resources to the first BS 402c concurrently with receiving a second signal in DL resources from the second BS 408c. Accordingly, self-interference may occur at the first UE 404c as a result of the first signal and the second signal being communicated simultaneously. Further interference may also occur at the first UE 404c via UE-based signals emitted from the second UE 406c.

Figure 5B:
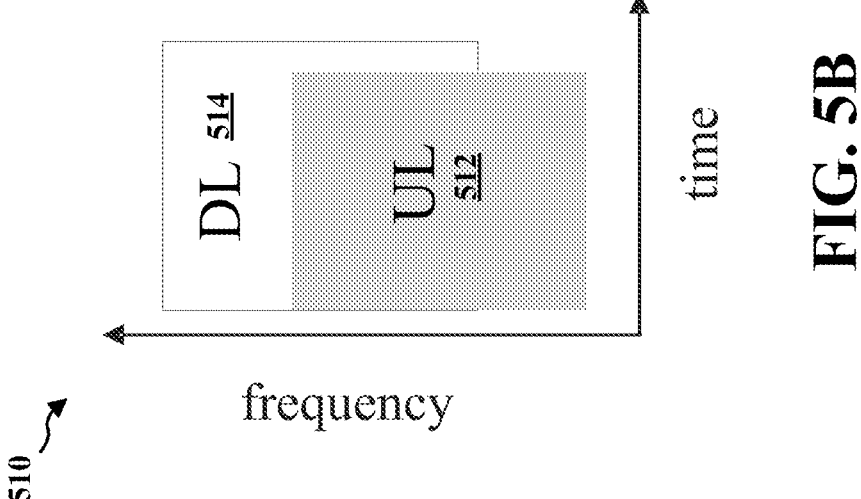
FIGS. 5A and 5B are diagrams illustrating examples of resources that are in-band FD (IBFD), in accordance with various aspects of the present disclosure.
Figure 5A:
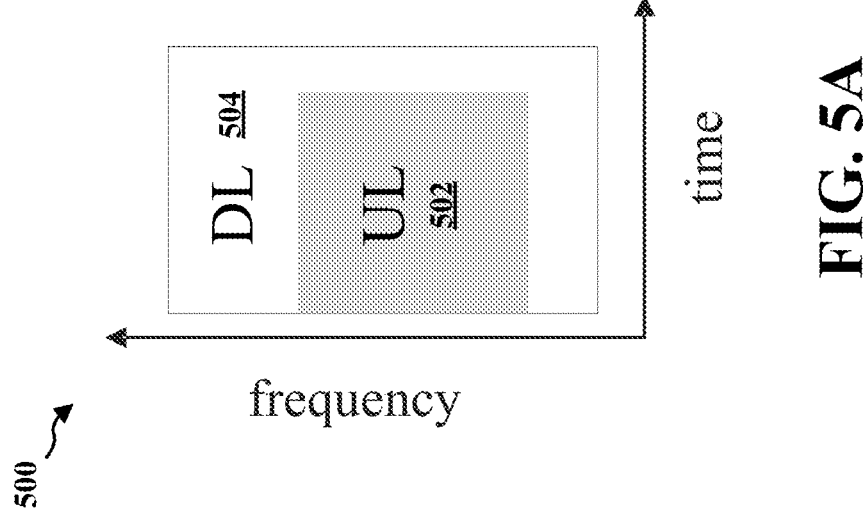

FIGS. 5A-5B illustrate a first example 500 and a second example 510 of resources that are IBFD resources. In general, FD operations may be grouped into two categories: (1) IBFD operations, and (2) sub-band FDD (or flexible FDD) operations. In IBFD, signals that are transmitted (e.g., UL signals) at least partially over in time and frequency with signals that are received (e.g., DL signals).

As shown in the first example 500, a time and a frequency allocation of an UL band (e.g., including UL resources 502) may fully overlap with a frequency allocation of a DL band (illustrated as DL resources 504). In addition, the UL resources 502 may fully overlap in time with the DL resources 504. By way of illustration, the UL resources 502 may be a subset of the DL resources 504, e.g., such that any UL signals on the UL resources 502 have the potential to be at the same time and frequency as a DL signal on the DL resources 504 (although the inverse is not necessarily true, as the DL resources 504 may span a longer duration and/or greater number of subcarriers than the UL resources 502).

In the second example 510 of IBFD, a frequency allocation of an UL band (illustrated as UL resources 512) may partially overlap with a frequency of allocation of a DL band (illustrated as DL resources 514). However, the UL resources 512 may fully overlap in time with the DL resources 514.

IBFD communication, such as that illustrated by the examples 500, 510 of FIGS. 5A and 5B, may be one implementation of FD operation, with flexible or sub-band FDD being another (but different) implementation of FD operation. In some implementations of sub-band FDD, and UL band and a DL band (while still transmitted and received at a same time) are transmitted and received using different frequencies.

For example, a DL band may be separated from an UL band in the frequency domain for sub-band FDD operations—e.g., a guard band including a set of subcarriers may separate the UL and DL bands or the UL and DL bands may be contiguous in the frequency domain (e.g., so that the guard band may be zero subcarriers). Given that output signals from a UE transmitter may have a leakage that extends outside the UL band, a guard band of some width may be advantageous for reducing interference between UL resources and DL resources. Sub-band FDD may also be referred to as "flexible duplex".

Figure 6:
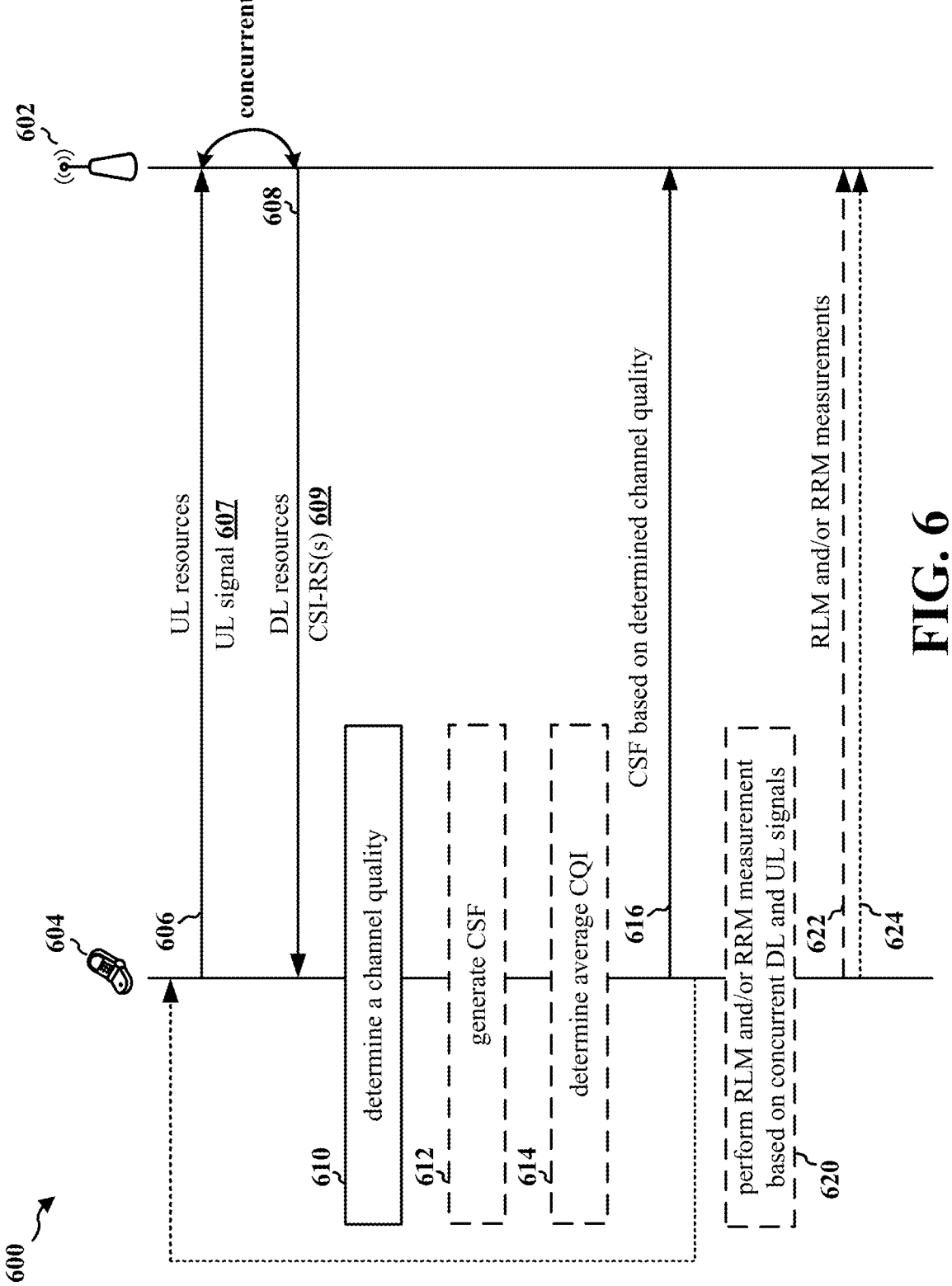
FIG. 6 is a call flow diagram illustrating example communications between a UE and a BS, in accordance with various aspects of the present disclosure.

FIG. 6 is a call flow diagram 600 illustrating communications between a UE 604 and a BS 602. For example, referring to FIGS. 1, 3, and 4, the UE 604 may be implemented as the UE 104, the UE 350, and/or one of the UEs 404a-c, 406a-c, while the BS 602 may be implemented as the BS 102/180, the BS 310, and/or one of the BSs 402a-c, 408a-c.

The BS 602 may configure DL resources 608 for the UE 604. In some aspects, the DL resources 608 may be associated with CSI—e.g., the DL resources 608 may be resources on which the BS 602 is scheduled to transmit CSI-RS(s) or the DL resources 608 may be resources reserved for CSI-IM and so no DL signals may be carried in the DL resources 608. To configure the UE 604, the BS 602 may transmit, to the UE 604, information indicating an allocation of the DL resources 608. Such information indicating the allocation of the DL resources 608 may further indicate that the DL resources 608 are associated with (e.g., reserved for) CSI-RS or CSI-IM.

In some aspects, the UE 604 may transmit an UL signal 607 in UL resources 606 to the BS 602. The UL signal 607 may be a SRS, DM-RS, PT-RS, data (on the PUSCH), control information (on the PUCCH). The UL signal 607 may be any UL transmission upon which a DL channel measurement can be performed, which may be any UL transmission the UE is allowed to transmit in IBFD and/or flexible FDD mode.

The UE 604 may monitor the DL resources 608 concurrently (in time) with the transmission of the UL signal. The DL resources 608 may be adjacent to (e.g., for flexible FDD) or at least partially overlapping (e.g., for IBFD) with the UL resources 606 in the frequency domain. However, the DL resources 608 may at least partially overlap with (e.g., may be concurrent or simultaneous with) the UL resources 606.

In some aspects, the UE 604 may monitor the DL resources 608 as CSI-IM resources. The CSI-IM resources may be resources on which the BS 602 does not schedule any DL signaling. Instead, the CSI-IM resources may be resources on which the UE 604 may measure energy and/or signal strength. As the BS 602 may refrain from transmitting during the CSI-IM resources, the energy and/or signal strength measured thereon by the UE 604 may indicate potential interference, e.g., from neighboring BSs and/or other UEs.

In some other aspects, the UE 604 may monitor the DL resources 608 in order to detect and/or receive at least one CSI-RS 609. The UE 604 may measure and/or determine values and/or other information based on receiving the at least one CSI-RS 609. For example, the UE 604 may measure or determine, based on the at least one CSI-RS 609, one or more of a reference signal received power (RSRP), received signal strength indicator (RSSI), reference signal received quality (RSRQ), signal-to-noise ratio (SNR), signal-to-interference-plus-noise ratio (SINR), and/or other measurement.

The UE 604 may make a determination 610 of channel quality associated with the DL resources 608 based on the UL signal 607 transmitted in the set of UL resources 606. Potentially, transmission of the UL signal 607 in UL resources 606 by the UE 604 may self-interfere with the DL resources 608.

As the UL signal 607 may introduce interference on the DL resources 608, the UE 604 may make the determination 610 of how the UL signal 607 impacts (e.g., interferes with) the DL resource 608. For example, the channel quality may be based on energy measured on the DL resources 608 (e.g., when the DL resources 608 are configured as CSI-IM resources) and/or the channel quality may be based on an RSRP, SNR, or other value measured based on the at least one CSI-RS 609 in the DL resources 608.

In some aspects, the determination 610 of the channel quality may include determination of CSI. For example, the UE 604 may determine one or more of an RI, PMI, CQI, and/or other CSI based on the interference in the DL resources 608 caused by the UL signal 607 in the UL resources 606. In some aspects, the UE 604 may determine the one or more of an RI, PMI, CQI, and/or other CSI for a wideband bandwidth. In some other aspects, the UE 604 may determine one or more of an RI, PMI, CQI, and/or other CSI for each sub-band of a plurality of sub-bands, e.g., of the DL resources 608.

Potentially, the CSI may be associated with a reporting frequency, such as periodic, semi-persistent, or a-periodic. In some aspects, the UE 604 may generate 612 CSF 616 based on periodicity of the CSI. For instance, a single CSF report may be generated when the CSI is periodic or multiple CSF reports may be generated on a semi-persistent or aperiodic basis when the CSI is not periodic.

In some other aspects, the UE 604 may also make a determination 614 of an average CQI value based on previous CSI. For example, the UE 604 may measure or determine a channel quality or CQI over an entire DL band and may compute an average quality or CQI for the DL band.

The UE 604 may then transmit CSF 616 to the BS 602 based on the determined channel quality. The CSF 616 may include one or more of an RI, PMI, CQI, and/or other CSI. The CSF 616 may indicate the interference on the DL resources 608 caused by the UL signal 607 on the UL resources 606.

In some aspects, the UE 604 may further transmit second CSF to the BS 602 based on a determined second channel quality, with the second channel quality being determined based on a second UL signal. The second UL signal may be similar to the UL signal 607; however, the second UL signal may be transmitted to the BS 602 based on a different configuration than the UL signal 607, such as a different transmit power, a different UL bandwidth, and/or a different waveform to provide different measurement characteristics. Additionally, if the second DL signal is received non-concurrently with any UL transmission, the UE 604 may transmit an indication to the BS 602 that the second channel quality was determined without a concurrent UL transmission.

In some further aspects, the UE 604 may perform 620 at least one radio link monitoring (RLM) and/or radio resource management (RRM) measurements, e.g., based on monitoring DL resources (e.g., the DL resources 608), which may be (nearly) adjacent to UL resources (e.g., the DL resources 608 and the UL resources 606 may be separated by a guard band). For example, the UE 604 may measure RSRP and/or RSRQ based on at least one DL signal received in DL resources (e.g., at least one CSI-RS 609 in the set of DL resources 608) from the BS 602. In another example, the UE 604 may measure RSRP and/or RSRQ based on at least one other DL signal received from another BS that is neighboring the BS 602. In some aspects, the UE 604 may refrain from transmission of any UL signals when the UE 604 performs 620 the RLM and/or RRM measurement(s) 622. In some other aspects, the UE 604 may transmit at least one UL signal concurrently with the performance 620 of the RLM and/or RRM measurement(s) 622.

The UE 604 may transmit to the BS 602 a report indicating the RLM and/or RRM measurements 622. Potentially, the UE 604 may transmit, to the BS 602, information 624 indicating that the RLM and/or the RRM measurements 622 associated with the report transmitted to the BS 602 was performed while the UE 604 was in a HD mode. The information 624 may be included in the same transmission or a different transmission from the report indicating the RLM and/or RRM measurements 622.

Figure 7:
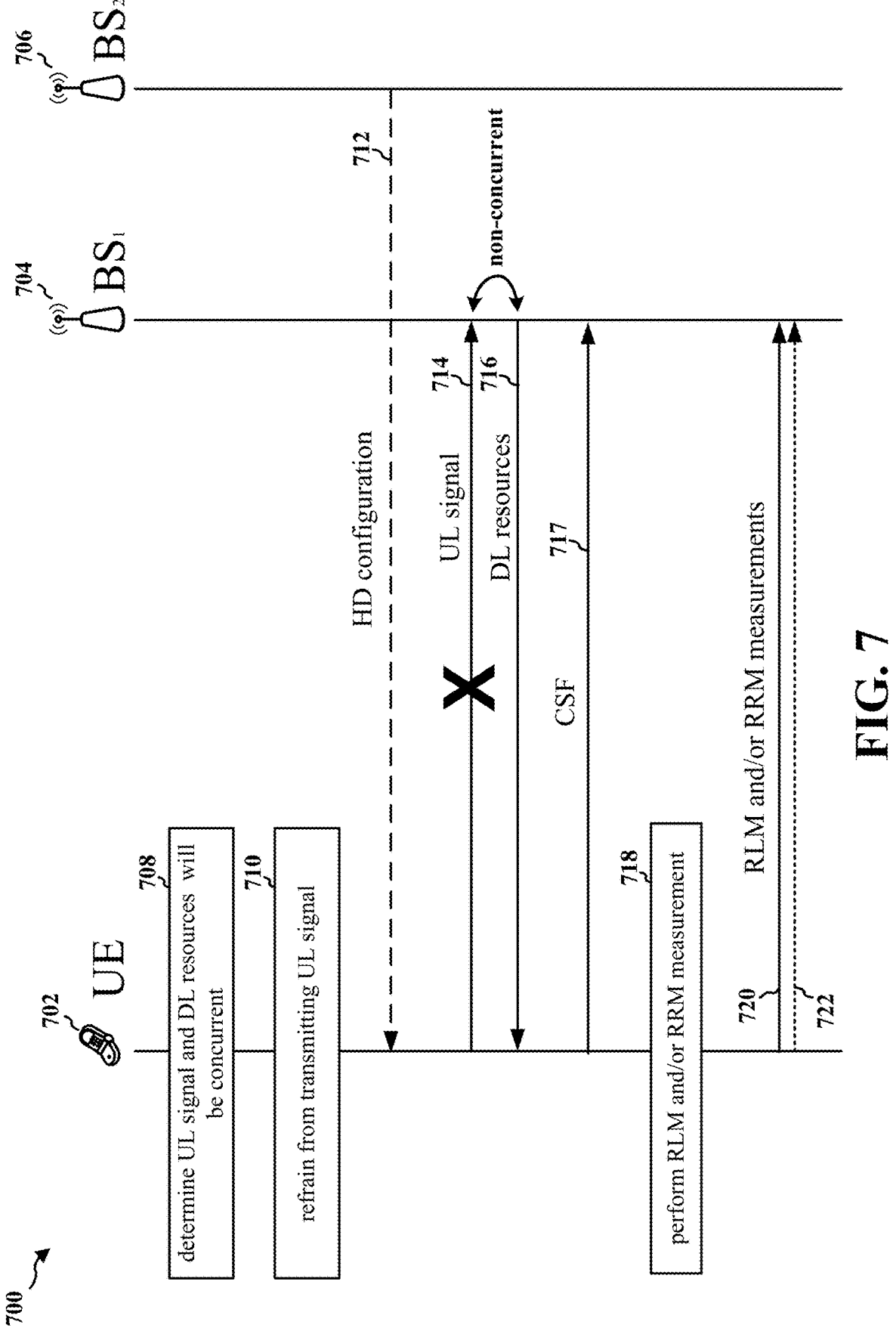
FIG. 7 is a call flow diagram illustrating other example communications between a UE and at least one BS, in accordance with various aspects of the present disclosure

FIG. 7 is a call flow diagram 700 illustrating communications between a UE 702 and at least one BS (e.g., a first BS 704 and a second BS 706). The UE 702 may determine 708 that an UL signal 714 will be transmitted to the first BS 704 concurrently with DL resources 716 on which at least one RLM and/or RRM measurement is to be performed.

The UE 702 may refrain 710 from transmitting the UL signal 714 to the first BS 704 while concurrently monitoring the DL resources 716, such as by dropping the UL signal 714 that was to be transmitted concurrently with the DL resources 716. Additionally or alternatively, the UE 702 may receive an HD mode configuration 712 from the second BS 706 that instructs the UE 702 to perform the RLM measurement and/or RRM measurement in a HD mode. The second BS 706 may be a same BS as the first BS 704 or a different BS from the first BS 704.

The UE 702 may then perform 718 the RLM and/or RRM measurements based on the received DL signal. For example, the RLM and/or the RRM measurements 720 may be performed by the UE 702 using a RS (e.g., a RSRP, a RSSI, etc.) that is indicative of whether a radio channel includes a link failure. The UE 702 may transmit a report indicating results of the RLM and/or RRM measurements 720. In some aspects, the UE 702 may transmit information 722 indicating that the RLM and/or RRM measurements 720 associated with the report were performed while in a HD mode (based on the HD mode configuration 712). The HD mode information 722 may be incorporated in a same transmission as the transmission of the RLM and/or RRM measurements 720 or in a separate transmission.

Figure 8:
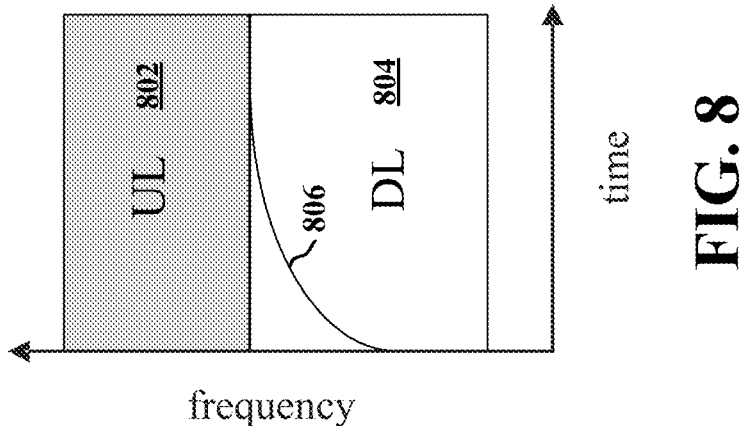
FIG. 8 is a diagram illustrating an example interference threshold between uplink resources and downlink resources, in accordance with various aspects of the present disclosure.

FIG. 8 illustrates an interference threshold 806 in relation to UL resources 802 and DL resources 804. The UE 604 is a FD UE configured to measure a channel quality for either IBFD (illustrated in FIGS. 5A-5B) operations or sub-band FDD (illustrated in FIG. 8) operations. That is, the UE 604 is configured to measure the channel quality even when an UL transmission is in a same band or a closely adjacent band to a DL transmission. Different characteristics may be relied upon for channel measurement and channel quality determinations in such instances than when, for example, the UL resources and the DL resources are sufficiently separated so as to not interfere with each other. Thus, channel measurement and channel quality determinations for closely adjacent or overlapping bands may be performed in the presence of a UL transmission, where interference may result. The UE 604 may then report CSF to the BS 602 in accordance therewith, based on CSI-RS and/or CSI-IM in the DL transmission received during transmission of the UL. CSI-IM may be different from CSI-RS, or CSI-IM may correspond to a special type of CSI-RS.

In sub-band FDD, the UL resources 802 may be immediately adjacent to the DL resources 804 (e.g., with no guard band in between) or closely adjacent to the DL resources 804 (e.g., separated by a guard band). A proximity of the UL resources 802 to the DL resources 804 may be based on an interference threshold 806, which is indicative of a leakage from the UL transmission to the signal received on the DL reception that may be suppressed by the UE 604. The interference threshold 806 may corresponds to a monotonically decreasing function.

The effects of interference caused by an UL transmission to the DL channel may be measured via a network configuration. In one aspect, CSI-RS may be scheduled in the DL band at a same time as an UL signal is transmitted in an adjacent UL band to measure an effect of the UL transmission interference on the DL channel. For a granted UL transmission, the UE 604 may transmit PUSCH or PUCCH. Additionally or alternatively, the UE 604 may transmit a SRS in the UL band, even without a grant from the BS 602. Channel measurement and reporting by the UE 604 may be performed via different configurations of the UL signal with different adjacent channel leakage ratio (ACLR) characteristics. Various UL configurations may be based on a power, bandwidth, waveform, etc., of the UL signal. In particular, even though channel measurement and reporting may have been performed for a first UL signal, a changed bandwidth, power, waveform, etc., may have an impact upon the interference observed on the DL that results from the UL transmission (e.g., the interference may be higher or lower).

Upon measuring the CSI-RS received in the DL signal, the UE 604 may identify a CQI value and report the CQI value to the BS 602. Based on the CQI value, the network may determine the quality of the channel. That is, the UE 604 simply measures the quality of the channel at different frequencies/RB s and reports the measured quality to the BS 602. Leakage from the UL signal may have a specific characteristic that is expressed via the interference threshold 806 (e.g., the interference threshold decreases monotonically as a distance from the UL signal increases). As a result, wideband and sub-band CQI values may be identified and reported differently. To identify a wideband CQI, the UE 604 may transmit a single value to the BS 602 indicative of an average quality over the entire DL band. This is in contrast to identification of a sub-band CQI in which the UE 604 transmits a value for any of one or more specific frequency ranges within the DL band.

The BS 602 may be configured to identify an ACLR profile (e.g., leakage performance) that is at least one of independently measured and transmitted from the UE 604 or based on assisted information (e.g., the UE 604 may indicate to the BS 602 what the ACLR profile looks like). The BS 602 may also be configured to transmit a request to the UE 604 that causes the UE 604 to report a CQI. As noted, a wideband CQI is indicative of an average quality over the entire DL band. Since the BS 602 is configured to identify the ACLR profile, the BS 602 is further able to determine a quality of the channel based on a comparison between the wideband CQI to the ACLR profile. For sub-band CQI, the UE 604 may report CQI based on a fixed sub-band size or a variable sub-band size. Given that there is often little variation in CQI values among locations that are close to the UL resources 802, a fixed sub-band size may be desirable for CQI reporting at such locations. In contrast, when the same bandwidth is located farther away from the UL resources 802, there may be a high level of variation among the CQI values. In this case, variable sub-band size may be desirable to capture a wider area than what is otherwise captured via the fixed sub-band size. This characteristic is represented by the sharp drop-off in the interference threshold 806, which supports utilization of a smaller band size for RBs that are closer to the UL resources 802 and a larger band size for RBs that are farther away from the UL resources 802.

FIGS. 9A-9B illustrate CQI offset tables. For sub-band CQI reporting, the UE 604 reports an average quality value to the BS 602 for the entire band as well as an offset level for each sub-band. Sub-band CQI offset values may be determined based on generation of a new offset level table (e.g., the offset table 900) or a modified offset level table (e.g., the offset table 910). When the interference from the UL signal is represented by a monotonically decreasing function, the average quality value will be higher at points that are near the maximum of the curve. Accordingly, negative offsets may be reported to the BS 602 more frequently than positive offsets, where a "0" offset indicates that a sub-bad comprises the same CQI as the average CQI. In FIG. 9A, the new offset table 900 is defined that maintains a same number of bits for the CQI (e.g., 2-bits that provide 4 offset level options). In FIG. 9B, the modified offset level table 910 is defined based on an increased number of bits (i.e., 3-bits that provide 8 offset level options). Accordingly, the modified offset level table 910 may provide a more precise offset for the CQI.

Given that CQI, RI, and PMI may all be transmitted in CSF, the UE 604 may further be configured to provide an indication of different RI or PMI for different sub-bands. More specifically, the UE 604 may report N RIs, L PMIs, and M sub-band CQIs, where N, L, and M do not necessarily represent the same number. In a first embodiment, the reporting may be performed by having explicitly different codebook-subset-restrictions in different sub-bands (e.g., a single RI may correspond to a set number of sub-bands, such as two sub-bands). In a second embodiment, the reporting may be performed by having a same sub-band configuration for CQI, RI, and PMI that allows sub-band-based CQI, RI, and PMI reporting. That is, the UE 604 may transmit a report indicative of RI and PMI based on a same sub-band configuration as utilized for the CQI. In a third embodiment, the reporting may be performed by having separate sub-band configurations for CQI, RI, and PMI.

Reporting may be performed differently by the UE 604 via periodic CSI (P-CSI), semi-persistent CSI (SP-CSI), or aperiodic CSI (A-CSI) to increase performance and/or reduce signaling overhead. For P-CSI reporting, the UE 604 may provide to the BS 602 a single CQI/RI/PMI report (or two CQIs in the case of two codebooks) on a periodic basis. For SP-CSI reporting and A-CSI reporting, the UE 604 may utilize a sub-band-based approach where the BS 602 is provided with a single CQI/RI/PMI report and subsequent reports are provided based on a semi-persistent and/or aperiodic basis.

In IBFD operations, the UL resources (e.g., the UL bands allocated as UL resources 502 and 512) may overlap fully or partially with the DL resources (e.g., the DL bands allocated as DL resources 504 and 514). IBFD capable UEs may be configured to report the channel quality within the overlapping region illustrated in FIGS. 5A-5B. IBFD capable UEs may perform channel measurement and reporting based on a received CSI-RS in a same band as a band which is included in an active UL transmission as well as a received CSI-RS that is in a band which is outside a frequency band of the active UL transmission.

An active UL transmission may be utilized to facilitate channel quality measurements by the UE 604. The active UL transmission for which a DL channel measurement is performed may be any UL transmission that is allowed in IBFD/sub-band FDD modes. For example, the UL transmission may include a PUSCH, a PUCCH, or a physical random access channel (PRACH), so long as the UE 604 is configured to provide such transmissions. If the UE 604 is not configured for any UL transmissions, the UE 604 may transmit an indication that the reported measurement is performed with no UL transmission; or, if the UE is configured to measure FD channels in such resources, the UE 604 may transmit a SRS. The configuration of the UE 604 may be based on whether the UE 604 has received a UL grant from the BS 602. When the UE 604 does not transmit a UL signal, an indication may be provided to the BS 602, so that the BS 602 may account for the lack of an UL signal.

In some aspects, multiple CSF reports indicative of interference cancellation (IC) capabilities of the UE 604 may be transmitted to the BS 602. The UE 604 may transmit a first CSF report for a channel when the IC is switched on and a second CSF report for the channel when the IC is switched off, so that the BS 602 may determine whether or not IC is desirable. Multiple CSF reports may also be transmitted to the BS 602 that are indicative of active/inactive UL transmissions of the UE 604. Since active/inactive transmission is independent of whether the IC is on or off, such CSF reports provide further information to the BS 602 regarding characteristics of the channel.

In addition to the foregoing, UL signals transmitted during FD operations may impact RLM and/or RRM determinations as a result of self-interference caused by the UL transmission. RLM may be performed to identify radio channels that are to be evaluated for link failure. A RS may be received by the UE 604, which determines, based on the RS (e.g., based on measuring or determining an RSRP, RSRQ, SNR, SINR, RSSI, and/or other value in comparison to a threshold), whether a radio channel includes a link failure. While the UE 604 may indicate to the BS 602 that a link failure was identified during a FD operation, the indication may misrepresent the present conditions in that the UL transmission may be causing too much interference to establish a desirable connection via the link. As such, in some aspects, the UE 604 may be configured without UL transmissions in symbols where the UE performs RLM measurements (e.g., there is no FD in the symbols where RLM measurements are made). If the UE 604 is configured with UL transmissions in such symbols, the UL transmission may be dropped by the UE 604. In an example, the BS 602 may provide an explicit indication that the UE 604 is to be in a HD mode while measuring RLM resources; otherwise, the BS 602 may operate under an assumption that RLM measurements were performed in a HD mode. Additionally or alternatively, a FD capable UE may perform RLM and RRM measurements when configured with a guard band that is sufficiently sized to account for the residual self-interference of the UE 604. Transmit power of the UL resources can likewise be manipulated to achieve a similar purpose.

When the UE 604 is in a radio resource control (RRC) connected state, the UE 604 may be similarly configured without UL TX in symbols where the UE 604 performs RRM measurements (e.g., within a SS/PBCH block measurement time configuration (SMTC) window). Again, there is either no FD in these symbols because the UE 604 is not configured to transmit on the UL during the RRM measurement; or, if the UE 604 is configured with UL TX in these symbols, the UL TX is dropped by the UE 604. The UE 604 may report to the BS 602 whether the RRM measurement is based on a FD UE or a non-FD UE (e.g., a HD UE) capability. The network may then refine the reported measurement for further evaluation. If a cross link interface (CLI) is available at the network, the network may be configured to identify currently scheduled UEs and determine whether the currently scheduled UEs are in a FD mode.

Figure 10:
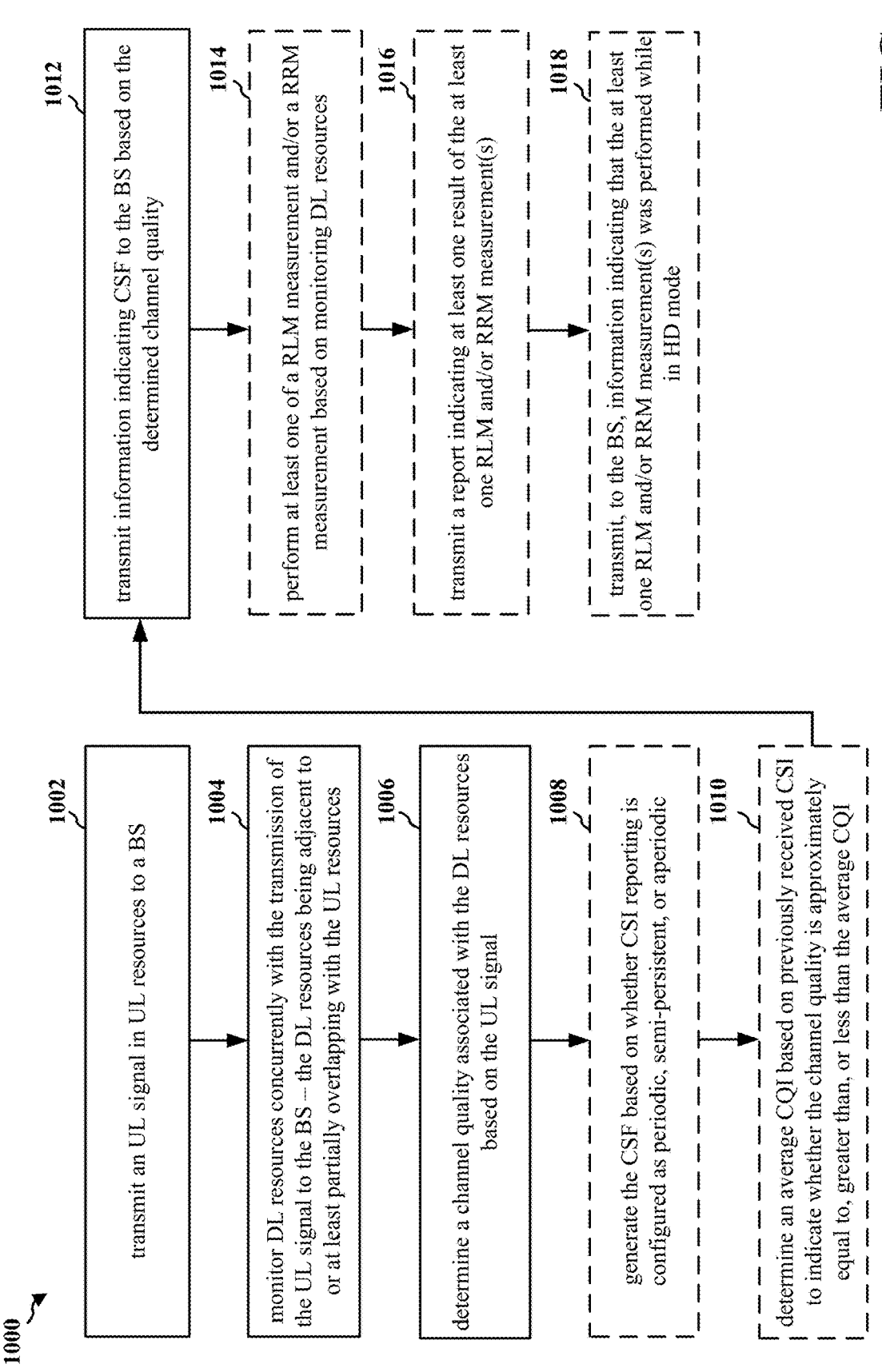
FIG. 10 is a flowchart illustrating an example method of wireless communication by a UE, in accordance with various aspects of the present disclosure.

FIG. 10 is a flowchart 1000 of a method of wireless communication of a wireless device. The method may be performed by a device at a UE (e.g., the UE 104, 350, 404a-c, 406a-c, 604, 702, which may include the memory 360 and which may be the entire UE 604 or certain components of the UE 604, such as at least one processor, for example, the TX processor 368, the RX processor 356, and/or the controller/processor 359, any combination of which may comprise means for performing the functionalities illustrated in the method of flowchart 1000) or apparatus (e.g., the apparatus 1202). According to different aspects, one or more operations may be omitted, transposed, and/or contemporaneously performed—e.g., some operations illustrated with dashed lines may be omitted in some aspects.

At 1002, the UE transmits an UL signal in UL resources to a BS. For example, referring to FIG. 6, the UE 604 transmits an UL signal 607 in UL resources 606 to the BS 602. The UL signal may include at least one of a SRS, DM-RS, a signal associated with control information on a PUCCH (e.g., a signal within a slot in which the PUCCH is scheduled), a signal associated with data on a PUSCH (e.g., a signal within a slot in which the PUSCH is scheduled), or another signal (e.g., another reference signal).

At 1004, the UE monitor DL resources concurrently with the transmission of the UL signal. The DL resources are adjacent to the UL resources or at least partially overlapping with the UL resources. For example, the DL resources may at least partially overlap with the UL resources in the time domain, whereas the DL resources may be adjacent to or at least partially overlapping with the UL resources in the frequency domain. In some aspects, the UE may monitor the DL resources based on a configuration from the BS, which may configure the DL resources as CSI-IM resources or may transmit at least one CSI-RS in the DL resources. For example, referring to FIG. 6, the UE 604 monitors DL resources 608 from the BS 602 concurrently with transmitting the UL signal 607 in UL resources 606 to the BS 602 at 606. In some aspects, the UE 604 may receive at least one CSI-RS 609 in the DL resources 608 from monitoring the DL resources 608. Referring to FIGS. 5A, 5B, and 8, the DL resources 804 are adjacent to the UL resources 802, the DL resources 514 are partially overlapping with the UL resources 512, and the UL resources 502 are fully overlapping with the DL resources 504.

At 1006, the UE determines a channel quality based on the UL signal in the UL resources. The channel quality may be associated with the DL resources. For example, the UE may measure an RSRP, SNR, or other value based on receiving at least one CSI-RS in the DL resources, or the UE may measure a total energy in DL resources configured as CSI-IM resources. Based on the measurements, the UE may determine (e.g., calculate, select, generate, etc.) at least one of a PMI, RI, CQI, and/or other CSI, e.g., for each sub-band of a plurality of sub-bands or for the wideband. For example, referring to FIG. 6, the UE 604 determines 610 a channel quality associated with the DL resources 608 based on the UL signal 607 in the UL resources 606. The determination of the channel quality may be based on a comparison of first CSI determined from transmitting the UL signal 607 with concurrently with monitoring the DL resources 608 to second CSI determined from monitoring the DL resources 608 while concurrently refraining from transmitting any UL signals. The CSI may be based on at least one CSI-RS 609 received in DL resources 608 (e.g., CSI-RS resources and/or the DL resources 804) or measuring energy (e.g., signal strength, interference, etc.) on the DL resources 608 configured as CSI-IM resources.

In some aspects, such as for IBFD, the UE may determine at least one channel quality (e.g., perform one or more measurements) in a band that is included in both the DL resources and the UL resources. That is, the UE may perform one or more measurements associated with channel quality based on at least one CSI-RS received in the same band as the UL signal is concurrently transmitted. In addition, the UE may determine at least one channel quality (e.g., perform one or more measurements) in a band adjacent to that including both the DL resources and the UL resources. That is, the UE may perform one or more measurements associated with channel quality in a band adjacent to that in which at least one CSI-RS received and the UL signal is concurrently transmitted (e.g., when the UE transmits the UL signal in the same band, the UE may perform measurements for channel quality in adjacent bands).

In one configuration, at 1008, the UE generates CSF based on whether CSI reporting by the UE is configured as periodic (e.g., P-CSI), semi-persistent (e.g., SP-CSI), or aperiodic (e.g., A-CSI). Thus, in some aspects, the UE may determine a reporting configuration associated with CSI, and the reporting configuration may indicate CSI reporting is to be one of periodic, semi-persistent, or aperiodic. For example, the UE may receive, from the BS, information configuring periodicity of CSI reporting (e.g., information configuring one of aperiodic CSI reporting, semi-persistent CSI reporting, or periodic CSI reporting). For example, the UE may generate a single CSF report for the BS when configured for CSI reporting that is periodic—e.g., the single CSF may include a single RI, PMI, CQI, and/or other CSI, which may be applicable to a wideband bandwidth—however, two CQIs may be included in the CSF when two codebooks are configured. In another example, the UE may generate multiple CSF reports for the BS when the UE is configured for CSI reporting that is semi-persistent or aperiodic—e.g., each CSF report may include at least one of RI, PMI, CQI, and/or other CSI for each sub-band of a plurality of sub-bands. Referring to FIG. 6, the UE 604 generates 612 CSF 616 based on whether CSI reporting for the BS is configured to be periodic, semi-persistent, or aperiodic.

In one configuration, at 1010, the UE determines an average CQI based on previous CSI. Accordingly, the CSF may include CQI that is transmitted to the BS to indicate whether the CQI is approximately equal to the average CQI, is greater than the average CQI, or is less than the average CQI. For example, referring to FIG. 6, the UE 604 determines 614 the average CQI, such as by measuring a channel quality of subcarriers extending over the entire DL band allocated as DL resources 804 and/or by computing an average quality for the DL band allocated as DL resources 804. In some configurations, a plurality of CQI may be determined by the UE 604, where each CQI of the plurality of CQI is associated with a different sub-band of a plurality of sub-bands of the DL resources.

At 1012, the UE transmits information indicating CSF to the BS based on the determined channel quality. In some aspects, such as for IBFD, the UE may transmit information indicating CSF that is based on at least one CSI-RS received in the same band as the UL signal is concurrently transmitted, and potentially, indicating CSF that is based on measurements outside of the same band (e.g., when the UE transmits the UL signal in the same band, the UE may perform measurements for channel quality in adjacent bands). The information indicating the CSF may indicate the band(s) associated with the CSF. For example, the UE may report, in the information indicating the CSF, the channel in the overlapping bandwidth between the UL and DL resources.

For example, referring to FIGS. 6 and 8, the UE 604 transmits CSF 616 to the BS 602, which may include at least one of the CQI, a RI, and/or a PMI associated with the DL resources 804. The CSF transmitted by the UE 604 to the BS 602 may further include the plurality of CQI, a plurality of RI, and/or a plurality of PMI, wherein each of the CQI, the RI, and/or the PMI of the plurality of CQI, the plurality of RI, and/or the plurality of PMI, respectively, is associated with a different sub-band of a plurality of sub-bands of the DL resources 804. Each sub-band of the plurality of sub-bands associated with each of the CQI, the RI, and/or the PMI may extend over a same number of RBs within the DL resources 804 or may extend over an increasing number of RBs within the DL resources 804 as the sub-band is further from the UL resources 804.

In some aspects, when the CSF includes CQI, RI, and/or PMI, each of the CQI, RI, and/or PMI may be reported to the BS based on different codebook subset restrictions in different sub-bands with the DL resources for the CQI, RI, and/or PMI. In some other aspects, when the CSF includes CQI, RI, and/or PMI, each of the CQI, RI, and/or PMI may be reported to the BS based on the same sub-band configurations within the DL resources for CQI, RI, and/or PMI (e.g., sub-band based reporting of CQI, RI, and/or PMI). In some other aspects, when the CSF includes CQI, RI, and/or PMI, each of the CQI, RI, and/or PMI may be reported to the BS based on different sub-band configurations within the DL resources for CQI, RI, and/or PMI.

In one configuration, the UE transmits a second UL signal in second UL resources to the BS and monitors concurrently second DL resources configured by the BS. The second DL resources may be adjacent to the second UL resources or at least partially overlapping with the second UL resources. The UE may then determine a second channel quality based on monitoring the second DL resources. The UE may transmit, to the BS, second CSF based on the determined second channel quality. For example, referring to FIG. 6, the UE 604 may transmit a second UL signal similar to the UL signal 607, but the second UL signal may be transmitted with a different configuration associated with at least one of a different transmit power, different UL bandwidth, or different waveform.

In another configuration, the UE monitors other DL resources non-concurrently with any UL transmission from the UE. The UE may then determine another channel quality based on monitoring the other DL resources without any interference caused by an UL signal transmitted by the UE. The UE may then transmit, to the BS, other CSF that is based on the other second channel quality and an indication that the other channel quality was determined without a concurrent UL transmission. For example, referring to FIG. 6, the UE 604 may determine 610 the channel quality associated with the DL resources 608 without the UL signal 607. Referring to FIG. 7, the UE 702 may refrain from transmitting any UL signal 714 that is concurrent with the DL resources 716. The UE 702 may then transmit CSF 717 that is based on measurements on the DL resources 716 (and/or at least one CSI-RS received therein).

In one configuration, at 1014, the UE performs at least one of a RLM measurement or a RRM measurement based on monitoring the DL resources concurrently while transmitting the UL signal. For example, the UE may select at least one resource in the time domain that is overlapping between the UL resources and the DL resources; however, the UL resources may be adjacent to the DL resources in aspects in which the UE performs the at least one of RLM and/or RRM measurements (e.g., the UL resources may be separated from the DL resources by a guard band). The UE may then measure at least one value indicative of energy, signal strength, and/or interference on the selected at least one resource. For example, the UE may measure RSRP and/or RSRQ of at least one DL signal received from the BS on the selected at least one resource and/or the UE may measure RSRP and/or RSRQ of at least one other DL signal received from another BS (e.g., neighboring the BS) on the selected at least one resource. For example, referring to FIG. 6, the UE 604 performs 620 the RLM and/or RRM measurement(s) 622 based on monitoring DL resources, such as based on receiving at least one CSI-RS 609 in the set of DL resources 608.

At 1016, the UE transmits a report to the BS indicating at least one result of the RLM and/or RRM measurement(s). In one configuration, a transmit power for the transmission of the UL signal may be less than a threshold power level (e.g., to mitigate interference from the UL signal). For example, referring to FIG. 6, the UE 604 transmit, to the BS 602, the RLM and/or RRM measurement(s) 622.

Further to the previously-described configuration, at 1018, the UE transmits information to the BS that indicates at least one of the RLM measurement and/or the RRM measurement 622 associated with the report was performed while in an HD mode. For example, referring to FIG. 6, the UE 604 may transmit the information 624 indicating the UE 604 is operating in an HD mode to the BS 602. Transmission of the information 624 indicating the UE 604 is operating in an HD mode may be a same transmission or a different transmission from the transmission of the RLM and/or RRM measurements 622.

FIG. 11 is a flowchart 1100 of a method of wireless communication of a wireless device. The method may be performed by a UE (e.g., the UE 104, 350, 404*a-c*, 406*a-c*, 604, 702, which may include the memory 360 and which may be the entire UE 604 or a component of the UE 702, such as at least one processor, for example, the TX processor 368, the RX processor 356, and/or the controller/processor 359, any combination of which may comprise means for performing the functionalities illustrated in the method of flowchart 1100) or other apparatus (e.g., the apparatus 1202). According to different aspects, one or more operations may be omitted, transposed, and/or contemporaneously performed—e.g., some operations illustrated with dashed lines may be omitted in some aspects.

At 1102, the UE determines that an UL transmission to a first BS will be concurrent with DL resources on which at least one of a RLM measurement or a RRM measurement will be performed. For example, referring to FIG. 7, the UE 702 determines 708 that the UL signal 714 is scheduled to be transmitted concurrently with the DL resources 716 to be monitored.

At 1104, the UE refrains from transmitting in UL to the first BS when monitoring DL resources to receive a DL signal. The UE may monitor DL resources to receive a DL signal from the first BS or from a second (e.g., neighboring) BS. For example, referring to FIG. 7, the UE 702 refrains 710 from transmitting in UL while monitoring the DL resources by dropping the UL signal 714 that was scheduled to be transmitted concurrently with the DL resources 716.

In an embodiment, the UE receives a configuration from a second BS to perform the at least one of the RLM measurement or the RRM measurement while in a HD mode. For example, referring to FIG. 7, the UE 702 may receive the configuration from the second BS 706, which causes the UE 702 to drop the UL signal 714 scheduled to be transmitted concurrently with monitoring the DL resources 716. The second BS 706 may be the same BS as the first BS 704 or a different BS from the first BS 704.

At 1108, the UE performs the at least one of the RLM measurement or the RRM measurement based on a received DL signal. The DL signal may be received from the first BS or from the second BS. The UE may measure at least one of an RSRP, RSRQ, SNR, and/or other value in response to receiving the DL signal, and the at least one of the RSRP, RSRQ, SNR, and/or other value may be used as the RLM measurement or the RRM measurement, e.g., when the DL signal is received from the first BS or the second BS, respectively. For example, referring to FIG. 7, the UE 702 performs 718 the RLM and/or RRM measurement 720 using a DL signal (e.g., reference signal) from the first BS 704 or the second BS 706.

At 1110, the UE transmits a report indicating at least one result of the RLM and/or RRM measurement. In some aspects, the report may indicate the at least one of the RSRP, RSRQ, SNR, and/or other value used as the RLM measurement or the RRM measurement, e.g., when the DL signal is received from the first BS or the second BS, respectively. For example, referring to FIG. 7, the UE 702 may transmit information indicating results of the RLM and/or RRM measurements 720 to the BS 704.

In one configuration, at 1112, the UE may transmit HD mode information indicating that the at least one of the RLM and/or RRM measurement(s) associated with the report were performed while in a HD mode (e.g., based on the HD mode configuration 712). For example, referring to FIG. 7, the UE 702 may transmit the HD mode information 722 to the BS 704. Transmission of the HD mode information 722 may be a same transmission or a different transmission from the transmission of the RLM and/or RRM measurements 720.

Accordingly, concurrent transmission of a UL signal in UL resources with monitoring DL resources (e.g., receiving CSI-RS(s) and/or monitoring CSI-IM resources) allows the UE to measure and/or determine a quality of a channel between the UE and the BS. Based on the determined channel quality, the UE can transmit CSF to the BS so that the BS can allocate DL resources in a manner that maintains the quality of the channel at or above a predefined threshold. As such, channel measurement and reporting by the UE can improve communicative efficiencies by minimizing conditions that lead to channel degradations below the predefined threshold.

Figure 12:
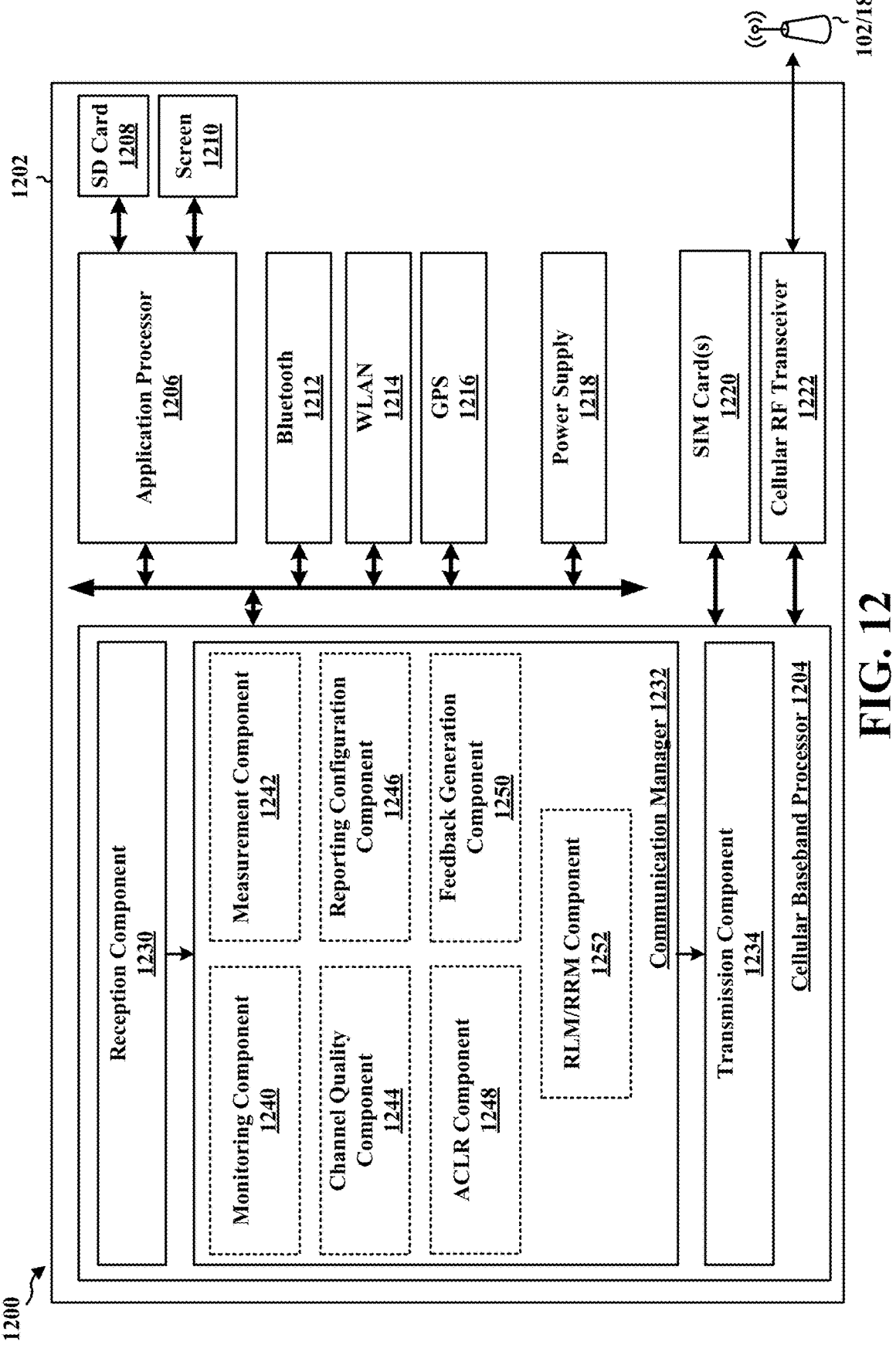
FIG. 12 is a diagram illustrating an example of a hardware implementation for an example apparatus, in accordance with various aspects of the present disclosure.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., the UE 350 of FIG. 3) and include the aforediscussed additional modules of the apparatus 1202.

In some aspects, the reception component 1230 may receive, from the BS 102/180, information configuring at least one set of UL resources and at least one set of DL resources for the apparatus 1202. A set of DL resources and a set of UL resources may at least partially overlap in the time domain—e.g., at least one symbol configured in the set of DL resources may simultaneously occur with at least one symbol configured in the set of UL resources. In the frequency domain, the set of DL resources may be adjacent to the set of UL resources (and potentially separated by a guard band), as with flexible FDD, or the set of DL resources may be at least partially overlapping with the set of UL resources, as with IBFD.

The set of DL resources may be associated with CSI. In some aspects, the reception component 1230 may receive, from the BS 102/180, information configuring the set of DL resources as CSI-IM resources. In some other aspects, the reception component 1230 may receive, from the BS 102/180, information configuring the set of DL resources to carry at least one CSI-RS—e.g., the information may schedule or allocate the set of DL resources to carry at least one CSI-RS from the BS 102/180.

In some aspects, the reception component 1230 may receive, from the BS 102/180, an UL grant associated with the set of UL resources. The UL grant may allocate or schedule an UL signal on the set of UL resources. For example, the UL grant may allocate or schedule the set of UL resources for control information to be carried on a PUCCH, or the UL grant may allocate or schedule the set of UL resources for data to be carried on a PUSCH.

In some further aspects, the reception component 1230 may receive, from the BS 102/180, a transmission configuration associated with transmission of the UL signal in the set of UL resources. The transmission configuration may indicate at least one of a transmission power, an UL bandwidth, and/or a waveform to be applied for the transmission of the UL signal in the set of UL resources. Potentially, the reception component 1230 may receive a plurality of transmission configurations, with at least one of a transmission power, an UL bandwidth, and/or a waveform in one transmission configuration differing from at least one other transmission power, UL bandwidth, and/or waveform in another transmission configuration.

The transmission component 1234 may be configured to transmit an UL signal in UL resources to the BS 102/180, e.g., as described in connection with 1002 of FIG. 10. The UL signal may be at least one of an SRS, DM-RS, a signal associated with control information on a (scheduled) PUCCH, a signal associated with data on a (scheduled) PUSCH, or another signal. In some aspects, the transmission component 1234 may transmit the UL signal in the UL resources based on the UL grant received from the BS 102/180. In some other aspects, the transmission component 1234 may transmit the UL signal in the UL resources without an UL grant, such as when the UL signal is an SRS.

The transmission component 1234 may obtain as input(s) from the reception component 1230 at least one of a transmission power, an UL bandwidth, and/or a waveform that is indicated in at least one transmission configuration received from the BS 102/180. The transmission component 1234 may apply at least one of the transmission power, UL bandwidth, and/or waveform for transmission of at least one UL signal in the UL resources.

Further, the communication manager 1232 may include a monitoring component 1240 that is configured to monitor the set of DL resources configured with the BS 102/180, e.g., as described in connection with 1004 of FIG. 10. The monitoring component 1240 may monitor the set of DL resources concurrently with the transmission of the UL signal in the set of UL resources by the transmission component 1234.

The communication manager 1232 further may include a measurement component 1242 that is configured to perform one or more measurements associated with the set of DL resources concurrently with the transmission of the UL signal. For example, the measurement component 1242 may measure energy on the set of DL resources concurrently with the transmission of the UL signal when the set of DL resources is configured as CSI-IM resources. In another example, the reception component 1230 is further configured to receive at least one CSI-RS from the BS 102/180 on the set of DL resources based on the monitoring of the set of DL resources by the monitoring component 1240, and the measurement component 1242 is configured to measure or otherwise determine at least one value (e.g., RSRQ, RSRQ, RSSI, SINR, SNR, and/or another value) in response to receiving the at least one CSI-RS on the set of DL resources being monitored.

The communication manager 1232 may include a channel quality component 1244 that is configured to determine a channel quality associated with the set of DL resources based on the UL signal transmitted in the set of UL resources, e.g., as described in connection with 1006 of FIG. 10. In some aspects, the channel quality component 1244 may obtain input(s) from the measurement component 1242 indicating the one or more measurements (e.g., measured energy, RSRP, SNR, etc.), and the channel quality component 1244 may determine CSI based on the one or more measurements.

For example, the channel quality component 1244 may determine at least one of a CQI, PMI, and/or RI based on the one or more measurements. In some aspects, the at least one of the CQI, RI, or PMI may be associated with a wideband bandwidth. In some other aspects, the set of DL resources is divided a plurality of sub-bands, and the channel quality component 1244 may determine at least one of a plurality of CQI that is each associated with a respective one of the plurality of sub-bands, a plurality of RI that is each associated with a respective one of the plurality of sub-bands, and/or a plurality of PMI that is each associated with a respective one of the plurality of sub-bands. Each sub-band of the plurality of sub-bands may extend over a same number of RBs of the set of DL resources, or each sub-band of the plurality of sub-bands may extend over an increasingly greater number of RBs of the set of DL resources in proportion to a distance from the set of UL resources.

In some aspects, the communication manager 1232 may include a reporting configuration component 1246 that is configured to determine a reporting configuration associated with CSI, with the reporting configuration indicating reporting of CSI is to be one of periodic, semi-persistent, or aperiodic. In some aspects, the reporting configuration may be received through the reception component 1230 from the BS 102/180. For example, the reporting configuration may be received in DCI or via RRC signaling.

In some aspects, the communication manager 1232 may include an ACLR component 1248 that is configured to determine an ACLR based on the transmission of the UL signal in the set of UL resources. For example, the ACLR component 1248 may determine (e.g., based on measurements performed in one or more sub-bands and/or channels adjacent to the set of DL resources) one or more values of an ACLR, e.g., when transmitting at least one UL signal in the set of UL resources concurrently with monitoring the set of DL resources.

Potentially, the ACLR component 1248 may determine a plurality of values of ACLR, with each of the plurality of values corresponding to a different transmission configuration used for transmission of an UL signal in a set of UL resources. Each ACLR value may correspond to a respective at least one of transmission power, UL bandwidth, and/or waveform. Thus, each ACLR value may implicitly indicate which transmission configuration can be applied to mitigate or minimize the amount of UL signal that introduces interference to adjacent channels (e.g., contiguous subcarriers and/or sub-bands).

The transmission component 1234 may transmit information indicating one or more ACLR values to the BS 102/180. However, the BS 102/180 may measure one or more ACLR values, e.g., when the apparatus 1202 transmits one or more UL signals, and therefore the apparatus 1202 may refrain from transmitting ACLR values to the BS 102/180.

The communication manager 1232 further may include a feedback generation component 1250 that receives input(s) based on the determined channel quality from the channel quality component 1244 and/or based on the CSI reporting configuration from the reporting configuration component 1246. The feedback generation component 1250 may be configured to generate information indicating CSF. For example, a CSF report may be associated with the set of DL resources and/or may be based on transmission of the UL signal in the set of UL resources that is either adjacent to or at least partially overlapping with the set of DL resources (e.g., in the frequency domain).

The feedback generation component 1250 may be configured to generate CSF to include and/or to be based on CSI, e.g., as determined by the channel quality component 1244. Therefore, the feedback generation component 1250 may be configured to generate a CSF report to include at least one of CQI, PMI, RI, and/or other CSI, e.g., as obtained from the channel quality component 1244.

For example, the feedback generation component 1250 may be configured to generate CSF to indicate a single RI, single PMI, and/or single CQI when the reporting configuration component 1246 provides input(s) indicating that CSI reporting is configured to be periodic; however, the CSF may include at least two CQIs when communication with the BS 102/180 uses two codebooks. In such an example, the RI, PMI, and/or CQI may be associated with a wideband bandwidth. In another example, the feedback generation component 1250 may be configured to generate a respective at least one of RI, PMI, and/or CQI for each sub-band of a plurality of sub-bands (e.g., into which the set of DL resources may be divided) when the reporting configuration component 1246 provides input(s) indicating CSI reporting is configured to be semi-persistent or aperiodic.

In yet other aspects, the feedback generation component 1250 may be configured to generate one or more CSF reports to indicate a first number N of RIs, a second number L of PMIs, and a third number M of CQIs for different sub-bands. For example, the feedback generation component 1250 may generate one or more CSF reports to indicate N RIs respectively determined for N sub-bands, L PMIs respectively determined for L sub-bands, and/or M CQIs respectively determined for M sub-bands. Potentially, at least two of L, M, and/or N may be equal.

According to one instance, the BS 102/180 may explicitly configure different codebook subset restrictions respectively corresponding to different sub-bands—e.g., at least one codebook subset restriction may be received through the reception component 1230 from the BS 102/180 via RRC signaling as a codebookSubsetRestriction information element or field thereof received. A codebook subset restriction may configure the N RIs for N sub-bands, L PMIs for L sub-bands, and/or M CQIs for M sub-bands.

According to another instance, each sub-band of the plurality of sub-bands may be associated with a separate configuration that configures each of the N RIs for N sub-bands, L PMIs for L sub-bands, and/or M CQIs for M sub-bands, with each of L, M, and N being equal according to a sub-band based configuration. According to still another instance, each of the N RIs for N sub-bands, L PMIs for L sub-bands, and M CQIs for M sub-bands may be individually configured.

When the BS 102/180 configures communication with the apparatus 1202 to include IBFD operation, the feedback generation component 1250 may be configured to generate CSF to report information based on the determined channel quality in the full channel composed of the overlapping bandwidth between the UL and DL resources. For example, the feedback generation component 1250 may include information indicating a set of measurements that is each based on the at least one CSI-RS received in the set of DL resources that overlaps with the of UL resources in which the at least one UL signal is transmitted. Further, the feedback generation component 1250 may include information indicating a set of measurements that is each based on at least one other band (e.g., sub-band(s) and/or channel(s)) that is adjacent to the set of DL resources overlapping with the set of UL resources (e.g., the one or more measurements may be performed in the adjacent band(s) when the at least one UL signal is transmitted).

In some additional aspects, the feedback generation component 1250 may be configured to generate a first CSF report that is based on the channel quality determined in association with the set of DL resources when the UL signal is transmitted in the set of UL resources and the apparatus 1202 refrains from perform interference cancellation (e.g., self-interference cancellation) in the set of DL resources on the UL signal. The feedback generation component 1250 may be configured to generate a second CSF report that is based on the channel quality determined in association with the set of DL resources when the UL signal is transmitted in the set of UL resources and the apparatus 1202 performs interference cancellation (e.g., self-interference cancellation) in the set of DL resources on the UL signal.

In still other aspects, the feedback generation component 1250 may be configured to generate a CSF report that is based on the channel quality determined in the set of DL resources in the absence of UL signal transmission. For example, such a CSF report may be based on a channel quality the reflects interference caused by neighboring BSs and/or UE(s), and is not representative of self-interference.

In even other aspects, the feedback generation component 1250 may be configured to generate at least one CSF report that is based on the channel quality determined when the transmission component 1234 transmits at least one UL signal in one set of UL resources according to one transmission configuration (e.g., one transmission power, UL bandwidth, and/or waveform). The feedback generation component 1250 may also be configured to generate at least one CSF report that is based on another channel quality determined when the transmission component 1234 transmits at least one other UL signal in another set of UL resources according to another transmission configuration (e.g., another transmission power, UL bandwidth, and/or waveform). Potentially, one or more ACLR values may be associated with each CSF report that is based on at least one UL signal transmitted according to a respective transmission configuration. Thus, the ACLR component 1248 and/or feedback generation component 1250 may be configured to generate information indicating which transmission configuration causes interference in adjacent bands (and the degree thereof).

The transmission component 1234 may obtain input(s) from the feedback generation component 1250 and may be further configured to transmit information indicating CSF to the base station 102/180, e.g., as described in connection with 1012 of FIG. 10. The transmission component 1234 may be configured to transmit the information indicating CSF on an uplink channel, such as a PUCCH or a PUSCH. In some aspects, the transmission component 1234 may be configured to transmit information indicating CSF based on at least one reporting configuration, e.g., as obtained via input(s) from the reporting configuration component 1246.

For example, the transmission component 1234 may be configured to transmit the information indicating CSF periodically, semi-persistently, or aperiodically (e.g., trigger-based) according to the reporting configuration. In some instances, the reception component 1230 may be configured to receive, from the BS 102/180, information triggering aperiodic transmission of the information indicating CSF, e.g., via DCI, RRC signaling, and/or MAC control element (CE). Accordingly, the transmission component 1234 may be configured to aperiodically transmit, to the BS 102/180, the information indicating CSF in response to receiving the information triggering aperiodic transmission through the reception component 1230.

In some other instances, the reception component 1230 may be configured to receive, from the BS 102/180, information triggering (or initiating) semi-persistent transmission of the information indicating CSF, e.g., via DCI, RRC signaling, and/or MAC CE. Accordingly, the transmission component 1234 may be configured to semi-persistently (e.g., periodically until released) transmit, to the BS 102/180, the information indicating CSF in response to receiving the information triggering (or initiating) semi-persistent transmission through the reception component 1230. Subsequently, the reception component 1230 may be configured to receive, from the BS 102/180, information releasing (or terminating) semi-persistent transmission of the information indicating CSF, e.g., via DCI, RRC signaling, and/or MAC CE. Accordingly, the transmission component 1234 may be configured to cease to transmit, to the BS 102/180, the information indicating CSF in response to receiving the information releasing (or terminating) semi-persistent transmission through the reception component 1230.

The communication manager 1232 may further include an RLM/RRM component 1252 that is configured to perform at least one of an RLM and/or RRM measurement based on monitoring DL resources, e.g., as described in connection with 1014 of FIG. 10. For example, the RLM/RRM component 1252 may be configured to perform the at least one RLM and/or RRM measurement based on at least one DL signal (e.g., CSI-RS or other DL signal) received in a set of DL resources that may be configured by the BS 102/180. In some configuration, the RLM/RRM component 1252 may be configured to perform the at least one RLM and/or RRM measurement when the apparatus 1202 is configured in an HD mode of operation.

Illustratively, the RLM/RRM component 1252 may be configured to measure an RSRP, RSRQ, and/or SNR in response to receiving at least one DL signal from the BS 102/180 and/or the RLM/RRM component 1252 may be configured to measure an RSRP, RSRQ, and/or SNR in response to receiving at least one other DL signal from another BS that is neighboring the BS 102/180. The RLM/RRM component 1252 may be configured to perform the at least one RLM and/or RRM measurement in the absence of any UL signals that may interfere with the at least one DL signal and/or at least one other DL signal.

The transmission component 1234 may be configured to transmit, to the BS 102/180, at least one report indicating the result(s) of performing the at least one RLM and/or RRM measurement, e.g., as described in connection with 1016 of FIG. 10. In some aspects, the transmission component 1234 may further be configured to transmit, to the BS 102/180, information indicating that the at least one RLM and/or RRM measurement was performed while the apparatus 1202 was configured in an HD mode of operation, e.g., as described in connection with 1018 of FIG. 10.

In some further aspects, the RLM/RRM component 1252 may be configured to determine that an UL signal to be transmitted to the BS 102/180 will be (e.g., is scheduled to be) concurrent with a DL signal based on which at least one RLM and/or RRM measurement is to be performed e.g., as described in connection with 1102 of FIG. 11. For example, the RLM/RRM component 1252 may identify a set of UL resources in the time domain in which the UL signal is scheduled to be transmitted, and further, may identify a set of DL resources in the time domain in which the DL signal is scheduled to be transmitted.

The RLM/RRM component 1252 may be configured to compare the set of UL resources to the set of DL resources, and based thereon, may determine if the UL and DL sets of resources are overlapping in time. If the UL and DL sets of resources are determined to be overlapping in time, the RLM/RRM component 1252 may determine that an UL signal to be transmitted to the BS 102/180 will be (e.g., is scheduled to be) concurrent with a DL signal based on which at least one RLM and/or RRM measurement is to be performed.

When the RLM/RRM component 1252 determines that an UL signal to be transmitted to the BS 102/180 will be (e.g., is scheduled to be) concurrent with a DL signal based on which at least one RLM and/or RRM measurement is to be performed, the RLM/RRM component 1252 may configure the transmission component 1234. Based on such configuration, the transmission component 1234 may refrain from transmitting in the UL to the BS 102/180 when receiving a DL signal in the DL, e.g., as described in connection with 1104 of FIG. 11.

In some aspects, the reception component 1230 may be configured to receive a configuration from a second BS (e.g., neighboring the BS 102/180) indicating that the RLM and/or RRM measurement(s) is to be performed while the apparatus 1202 is configured in an HD mode of operation, e.g., as described in connection with 1106 of FIG. 11.

The RLM/RRM component 1252 may be configured to perform at least one of the RLM and/or RRM measurement based on receiving a DL signal, e.g., as described in connection with 1108 of FIG. 11. The DL signal may be received from the BS 102/180 or from a BS neighboring the BS 102/180. For example, the RLM/RRM component 1252 may measure at least one of an RSRP, RSRQ, SNR, and/or other value in response to receiving at least one DL signal from the BS 102/180 or from a neighboring BS, and the result(s) of the RLM and/or RRM measurement(s) may be based on the at least one of the RSRP, RSRQ, SNR, and/or other value.

The transmission component 1234 may be configured to transmit a report indicating at least one result of the RLM and/or RRM measurement(s), e.g., as described in connection with 1110 of FIG. 11. For example, the transmission component 1234 may transmit such a report to the BS 102/180 (or potentially, to a neighboring BS). The transmission component 1234 may further be configured to transmit information indicating that the at least one of the RLM and/or RRM measurement(s) associated with the report was performed while in the HD mode, e.g., as described in connection with 1112 of FIG. 11.

The apparatus may include additional components that perform each of the blocks of the algorithm in the aforementioned call flow diagrams and/or flowcharts of FIGS. 6, 7, 10, and/or 11. As such, each block in the aforementioned call flow diagrams and/or flowcharts of FIGS. 6, 7, 10, and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for transmitting an UL signal in a set of UL resources configured with a BS. Further, the apparatus 1202, and in particular the cellular baseband processor 1204, includes means for monitoring a set of DL resources configured with the BS, the set of DL resources being adjacent to or at least partially overlapping with the set of UL resources. Further, the apparatus 1202, and in particular the cellular baseband processor 1204, includes means for determining a channel quality associated with the set of DL resources based on the UL signal transmitted in the set of UL resources. In addition, the apparatus 1202, and in particular the cellular baseband processor 1204, includes means for transmitting, to the BS, information indicating CSF based on the determined channel quality.

In some aspects, the set of UL resources at least partially overlaps with the set of DL resources in a time domain, and the set of UL resources is adjacent to or at least partially overlapping with the set of DL resources in a frequency domain.

In some aspects, the apparatus 1202, and in particular the cellular baseband processor 1204, may include means for receiving at least one CSI-RS in the set of DL resources, and the channel quality may be determined further based on the at least one CSI-RS.

In some aspects, the apparatus 1202, and in particular the cellular baseband processor 1204, may include means for measuring energy on the set of DL resources concurrently with transmission of the UL signal, with the set of DL resources being allocated as CSI-IM resources, and the channel quality being determined further based on the energy measured on the set of DL resources concurrently with the transmission of the UL signal.

In some aspects, UL signal includes at least one of an SRS, a DM-RS, a signal associated with control information on a PUCCH, and/or a signal associated with data on a PUSCH.

In some aspects, the apparatus 1202, and in particular the cellular baseband processor 1204, may include means for transmitting another UL signal in another set of UL resources with another configuration different from a first configuration with which the UL signal is transmitted in the set of UL resource, and the other configuration includes at least one of a transmit power, an UL bandwidth, or a waveform different from that included in the first configuration. In such aspects, the apparatus 1202, and in particular the cellular baseband processor 1204, may further include means for monitoring another set of DL resources configured with the BS, the other set of DL resources being adjacent to or at least partially overlapping with the other set of UL resources. Further to such aspects, the apparatus 1202, and in particular the cellular baseband processor 1204, may further include means for determining another channel quality associated with the other set of DL resources based on the other UL signal transmitted in the other set of UL resources. Also in such aspects, the apparatus 1202, and in particular the cellular baseband processor 1204, may further include means for transmitting, to the BS, other information indicating other CSF based on the other determined channel quality.

In some aspects, the information indicating the CSF includes at least one of a CQI, an RI, and/or a PMI. In some aspects, the set of DL resources includes a plurality of sub-bands, and the information indicating the CSF includes at least one of a plurality of CQI that is each associated with a respective one of the plurality of sub-bands, a plurality of RI that is each associated with a respective one of the plurality of sub-bands, or a plurality of PMI that is each associated with a respective one of the plurality of sub-bands. In some aspects, each sub-band of the plurality of sub-bands extends over a same number of RBs of the set of DL resources. In some aspects, each sub-band of the plurality of sub-bands extends over an increasingly greater number of RBs of the set of DL resources in proportion to a distance from the set of UL resources. In some aspects, the at least one of the CQI, RI, or PMI is associated with a wideband bandwidth.

In some aspects, the apparatus 1202, and in particular the cellular baseband processor 1204, may further include means for transmitting, to the BS, information indicating at least one ACLR.

In some aspects, the apparatus 1202, and in particular the cellular baseband processor 1204, may further include means for receiving an UL grant from the BS, and the UL signal may be transmitted in the set of UL resources based on the UL grant.

In some aspects, the apparatus 1202, and in particular the cellular baseband processor 1204, may further include means for determining a reporting configuration associated with CSI, with the reporting configuration indicating reporting of the CSI is one of periodic, semi-persistent, or aperiodic; and means for determining the CSF based on the reporting configuration, with the CSF being differently determined for the periodic CSI reporting, the semi-persistent CSI reporting, and the aperiodic CSI reporting.

In some aspects, the apparatus 1202, and in particular the cellular baseband processor 1204, may further include means for monitoring another set of DL resources configured with the BS, the other set of DL resources being adjacent or at least partially overlapping with another set of UL resources from which any UL signal is absent; means for determining another channel quality based on monitoring the other set of DL resources; and means for transmitting other information indicating another CSF based on the other channel quality.

In some aspects, the information indicating CSF includes at least a first CSF report that is based on interference cancellation, and a second CSF report that is based on absence of interference cancellation.

In some aspects, the apparatus 1202, and in particular the cellular baseband processor 1204, may further include means for performing at least one of a RLM measurement and/or a RRM measurement based on monitoring DL resources. In some aspects, the apparatus 1202, and in particular the cellular baseband processor 1204, may further include means for transmitting a report indicating at least one result of the at least one RLM and/or RRM measurement (s). In some aspects, the apparatus 1202, and in particular the cellular baseband processor 1204, may further include means for transmitting to the BS, information indicating that the at least one RLM and/or RRM measurement(s) was performed while in HD mode.

In some other aspects, the apparatus 1202, and in particular the cellular baseband processor 1204, may further include means for determining that an UL signal to be transmitted to a first BS will be concurrent with a DL signal based on which at least one RLM and/or RRM measurement (s) will be performed. In some other aspects, the apparatus 1202, and in particular the cellular baseband processor 1204, may further include means for refraining from transmitting in UL to the first BS while receiving a DL signal in the DL. In some other aspects, the apparatus 1202, and in particular the cellular baseband processor 1204, may further include means for receiving a configuration from a second BS to perform the at least one of the RLM and/or RRM measurement while in a HD mode. In some other aspects, the apparatus 1202, and in particular the cellular baseband processor 1204, may further include means for performing the at least one of the RLM and/or RRM measurement based on receiving a DL signal. In some other aspects, the apparatus 1202, and in particular the cellular baseband processor 1204, may further include means for transmitting a report indicating at least one result of the RLM and/or RRM measurement(s). In some other aspects, the apparatus 1202, and in particular the cellular baseband processor 1204, may further include means for transmitting information indicating that the at least one of the RLM and/or RRM measurement(s) associated with the report was performed while in the HD mode.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 13 is a flowchart 1300 of a method of wireless communication. The method may be performed by a BS (e.g., the BS 102/180, 310, 402a-c, 408a-c, 602, 704, 706) or apparatus (e.g., the apparatus 1402). According to different aspects, one or more operations may be omitted, transposed, and/or contemporaneously performed—e.g., some operations illustrated with dashed lines may be omitted in some aspects.

At 1302, the BS may transmit, to a UE, an UL grant allocating a set of UL resources to the UE for transmission of an UL signal. For example, referring to FIG. 6, the BS 602 may transmit an UL grant to the UE 604 that allocates the UL resources 606 to the UE 604 for transmission of the UL signal 607.

In some aspects, the BS may additionally transmit, to the UE, a configuration for transmission of the UL signal, and the configuration includes at least one of a transmit power, an UL bandwidth, or a waveform.

At 1304, the BS may configure the UE for reporting CSI that is one of periodic, semi-persistent, or aperiodic. For example, first, the BS may determine whether the periodicity at which the UE is to report CSI. Potentially, the BS may determine that the UE is not to report CSI at a periodicity, but rather the CSI reporting by the UE is to be aperiodic, e.g., such that CSI reporting by the UE is triggered by the BS. Then, the BS may transmit, to the UE, information indicating that the UE is to report CSI periodically, semi-persistently, or aperiodically. The BS may transmit such information via DCI and/or RRC signaling. For example, referring to FIG. 6, the BS 602 may configure the UE 604 for reporting CSI that is one of periodic, semi-persistent, or aperiodic.

At 1306, the BS may configure the UE with a set of DL resources associated with CSI. The set of DL resources may be adjacent to or at least partially overlapping with the set of UL resources. Specifically, the set of DL resources may at least partially overlap with the set of UL resources in the time domain; in the frequency domain, however, the set of DL resources may be adjacent to the set of UL resources (e.g., as separated by a guard band), such as for IBFD, or the set of DL resources may at least partially overlap with the set of UL resources, such as for flexible (or sub-band) FDD.

In some aspects, the BS may configure the DL resources as CSI-IM resources or the BS may configure the DL resources to carry at least one CSI-RS. To configure the UE with the set of DL resources, first, the BS may schedule or allocate a set of resources within a band at least partially dedicated to DL communication for CSI-IM or for CSI-RS transmission, and second, the BS may transmit information indicating the schedule or allocation of the set of resources to the UE. For example, referring to FIG. 6, the BS 602 may configure the UE 604 with the set of DL resources 608 associated with CSI. The set of DL resources 608 may be adjacent to or at least partially overlapping with the set of UL resources 606. For example, the BS 602 may configure the DL resources 608 as CSI-IM resources or the BS may configure the DL resources 608 to carry at least one CSI-RS 609.

At 1308, the BS may transmit, to the UE, at least one CSI-RS in the set of DL resources. For example, the BS may schedule at least one CSI-RS in the DL resources. In some other aspects, the BS may refrain from transmitting the at least one CSI-RS when the BS configures the DL resources as CSI-IM resources, e.g., as CSI-IM resources may be used to measure energy and/or signal strength from neighboring devices (e.g., neighboring BS(s), UE(s) operating in neighboring cell(s), and/or other BS(s) and UE(s)). For example, referring to FIG. 6, the BS 602 may configure the UE 604 with the set of DL resources 608 associated with CSI.

In some aspects, the UE may transmit at least one UL signal in the UL resources, which may be adjacent to or at least partially overlapping with the DL resources. For example, the UL signal may be at least one of an SRS, control information in a PUCCH, data in a PUSCH, a DM-RS, and/or another UL signal, which may or may not be a reference signal. Correspondingly, the BS may receive the at least one UL signal transmitted by the UE in the UL resources.

The UE may transmit the at least one UL signal based on the UL grant transmitted to the UE; however, the UE may transmit some UL signals (e.g., SRS) without an UL grant. Additionally or alternatively, the UE may transmit the at least one UL signal based on the configuration includes at least one of a transmit power, an UL bandwidth, or a waveform.

In some aspects, the UE may transmit different UL signals on different sets of UL resources based on different configurations (e.g., of different transmission powers, different UL bandwidths, and/or different waveforms). The UE may then determine a respective channel quality for each set of DL resources with which the UE is configured, e.g., when the UE transmits an UL signal in a respective set of UL resources corresponding to each of the sets of DL resources, or when the UE refrains from transmitting an UL signal in a respective set of UL resources corresponding to one of the sets of DL resources.

At 1310, the BS may receive, from the UE, information indicating CSF based on the set of DL resources. The CSF may include at least one of CQI, RI, PMI, and/or other CSI. For example, referring to FIG. 6, the BS 602 may receive, from the UE 604, information indicating the CSF 616, which may be based on the set of DL resources 608 configured by the BS 602 to be monitored by the UE 604.

The information indicating the CSF may include one or more CSF reports. For example, the information indicating the CSF may include a first CSF report based on the UL signal 607 in the UL resources 606 that are adjacent to or partially overlapping with the DL resources 608, a second CSF report based on another UL signal having a different configuration (e.g., different transmit power, different UL bandwidth, and/or different waveform) than the UL signal 607, and/or a third CSF report based on the absence of an UL signal in UL resources that are adjacent to or at least partially overlapping with DL resources configured to be monitored by the UE.

In addition, the information indicating the CSF may include information indicating the condition(s) under which the CSF was determined by the UE. For example, the information indicating the CSF may indicate the configuration with which the UE transmitted the UL signal. In another example, the information indicating the CSF may indicate whether the UE applied interference cancellation (e.g., self-interference cancellation) on the UL signal transmitted in the UL resources adjacent to or at least partially overlapping with the DL resources. In another example, the information indicating the CSF may indicate whether an UL signal was transmitted by the UE in the UL resources (e.g., the information may indicate that the CSF is based on measurements on the DL resources performed in the absence of any UL signals from the UE).

In some aspects, the information indicating the CSF may be based on the periodicity of CSI reporting with which the UE is configured. For example, the information indicating CSF may be different according to whether the UE is configured to periodically, semi-persistently, or aperiodically report CSI. In some further aspects, the information indicating CSF may include at least a first CSF report that is based on interference cancellation by the UE (e.g., the UE may perform self-interference cancellation, such as for the UL signal) and a second CSF report that is based on absence of interference cancellation by the UE (e.g., the UE may refrain from self-interference cancellation, such as for the UL signal).

In some aspects, the set of DL resources may be divided into a plurality of sub-bands (e.g., of the DL bandwidth), and the CSF may include a respective at least one of CQI, RI, PMI, and/or other CSI for each of the plurality of sub-bands. For example, each sub-band of the plurality of sub-bands may extend over an increasingly greater number of RBs of the set of DL resources in proportion to a distance from the set of UL resources. In another example, each sub-band of the plurality of sub-bands may extend over the same number of RBs of the set of DL resources. In some other aspects, the CSF may include at least one of CQI, RI, PMI, and/or other CSI for a wideband bandwidth, such as the DL bandwidth or a configured portion thereof.

In some aspects, the BS may further determine information indicating ACLR associated with transmission of the at least one UL signal by the UE in the UL resources. The information indicating ACLR may include an ACLR profile, and may indicate the ratio of transmitted power (e.g., used for UL signal transmission) to the power measured in an adjacent channel (e.g., the energy of the UL signal transmitted at the transmission power that "leaks" into adjacent sub-bands, which may not be allocated to the UL signal).

The ACLR may include and/or may be based on the amount of the at least one UL signal that "leaks" (e.g., the energy of the at least one UL signal that is detectable) on resources adjacent to the UL resources in which the UL signal is transmitted. Accordingly, the ACLR may include and/or may be based on energy from the UL signal that is detectable on at least one sub-band that is adjacent (e.g., contiguous) in a lower portion of the frequency spectrum (e.g., at least one lower sub-band) and/or in a higher portion of the frequency spectrum (e.g., at least one higher sub-band).

In some aspects, the BS may measure the ACLR, e.g., when the UE transmits the UL signal in the UL resources. In some other aspects, however, the BS may receive the information indicating the ACLR from the UE.

The BS may receive the information indicating the ACLR in a UE capability message or assisted information. For example, the ACLR may be measured by the UE when transmitting each of the at least one UL signal(s), with the ACLR being differently affected according to the respective configuration with which each of the at least one UL signal(s) is transmitted. That is, the ACLR may be affected according to the transmission power, UL bandwidth, and/or waveform used for transmission of an UL signal in UL resources.

At 1312, the BS may configure communication with the UE based on the information indicating CSF. For example, the BS may configure communication by determining (e.g., selecting, identifying, computing, etc.) one or more parameters associated with at least one of IBFD and/or flexible (or sub-band) FDD based on the information indicating the CSF; although such parameters may not necessarily be unique to IBFD and/or flexible FDD. Subsequently, the BS may apply at least one of the one or more parameters, e.g., so that transmission and/or reception by the BS to the UE is based on at least one parameter, and/or the BS may transmit information indicating at least one of the one or more parameters to the UE, e.g., so that transmission and/or reception by the UE to the BS is based on the at least one parameter. For example, referring to FIG. 6, the BS 602 may configure communication with the UE 604 based on information indicating the CSF 616 received from the UE 604.

In some aspects, the BS may configure communication with the UE further based on at least one ACLR. The BS may measure a value for ACLR and/or the BS may receive information indicating ACLR from the UE. In some aspects, the BS may configure communication with the UE based on a plurality of ACLRs, with each ACLR corresponding to a respective CSF and the channel quality on which the respective CSF is based. Illustratively, one ACLR may correspond to a CSF that is determined based on a channel quality that is determined in association with transmission of an UL signal contemporaneously with monitoring DL resources, another ACLR may correspond to a CSF that is determined based on a channel quality that is determined in association with transmission of another UL signal using a different configuration (e.g., different transmission power, different UL bandwidth, different waveform, etc.), a third ACLR may correspond to a CSF that is determined based on a channel quality that is determined in association with monitoring DL resources when the UE refrains from concurrently transmitting any UL signals.

As the one or more parameters are determined by the BS based on CSF associated with DL resources on a channel on which the BS and the UE are configured to communicate, the one or more parameters may be suitable for communication on the channel on which the BS and the UE are configured to communicate. For example, the one or more parameters may be suitable for FD operation (e.g., IBFD and/or flexible FDD) by at least the BS (e.g., the UE may be configured for FD or HD operation).

In some aspects, the BS may identify a value in the CSF, such as a CQI, and then the BS may access a table (e.g., lookup table) or other data structure, which may be keyed by value(s) from the identified in the CSF. Next, the BS may select a parameter that corresponds to the value according to the table or other data structure.

For example, the BS may identify, from the CSF, an index of CQI equal to two (2). The BS may then access a table or other data structure that is keyed by CQI index, and includes a set of columns having parameters corresponding to each CQI index, such as a modulation and coding scheme (MCS). The BS may identify at least one entry of the table or other data structure that corresponds to the CQI index of two— e.g., the at least one entry may include a first parameter, such as QPSK, from a column for a modulation scheme and a second parameter, such as 120×1024, from a column for a code rate. Thus, the BS may configure communication with the UE to have a modulation scheme of QPSK and a code rate of 120×1024 based on the CSF indicating a CQI having an index of two.

In some other aspects, the BS may configure precoding based on the information indicating CSF, such as a precoding matrix and/or precoding format. In further aspects, the BS may determine or select one or more of a transmission mode, a size of TB s, a number of spatial layers, and/or a number of TX and/or RX antennas based on the CSF. In still others aspects, the BS may determine, based on the CSF, whether the communication is codebook-based or non-codebook based and, if codebook-based, may configure a codebook. In even further aspects, the BS may determine MIMO parameters, TX and/or RX beams (e.g., transmission configuration indicator (TCI) states), and/or other parameter (s) based on the CSF.

Figure 14:
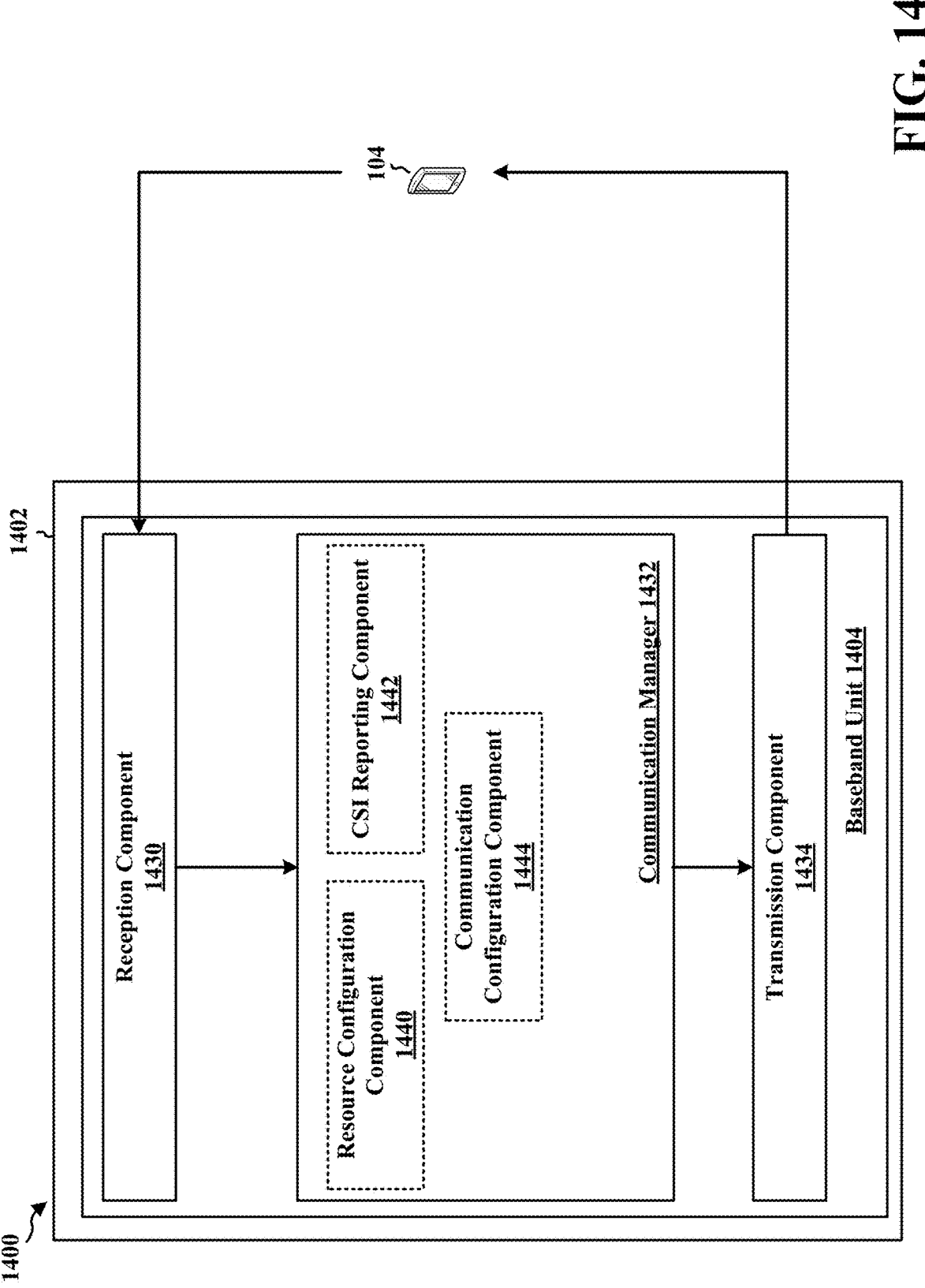
FIG. 14 is a diagram illustrating another example of a hardware implementation for another example apparatus, in accordance with various aspects of the present disclosure.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

In some aspects, the transmission component 1434 may be configured to transmit, to the UE 104, at least one UL grant allocating at least one set of UL resources to the UE 104 for transmission of at least one UL signal, e.g., as described in connection with 1302 of FIG. 13. In some other aspects, the UL resources may not include any UL signals— e.g., the transmission component 1434 may refrain from transmitting an UL grant to the UE 104.

Further, the transmission component 1434 may be configured to transmit, to the UE 104, a configuration for transmission of the UL signal, with the configuration indicating at least one of a transmit power, an UL bandwidth, and/or a waveform.

In some aspects, the reception component 1430 may be configured to receive at least one UL signal from the UE 104 in the set of UL resources. For example, the at least one UL signal may be received based on the at least one UL grant and/or may be received based on the configuration indicating the transmit power, UL bandwidth, and/or waveform. According to various aspects, the at least one UL signal may be at least one of an SRS, control information in a PUCCH, data in a PUSCH, a DM-RS, and/or another UL signal, which may or may not be a reference signal.

In some aspects, the communication manager 1432 may include a CSI reporting component 1442 that configures the UE 104 for reporting of CSI that is one of periodic, semi-persistent, and/or aperiodic, e.g., as described in connection with 1304 of FIG. 13.

The communication manager 1432 further may include a resource configuration component 1440 that configures the UE 104 with a set of DL resources associated with CSI, and the set of DL resources may be adjacent to or at least partially overlapping with the set of UL resources, e.g., as described in connection with 1306 of FIG. 13. The set of UL resources may at least partially overlap with the set of DL resources in a time domain and the set of DL resources may be adjacent to or at least partially overlapping with the set of UL resources in a frequency domain.

In some aspects, the resource configuration component 1440 may configure the set of DL resources as CSI-IM resources for the UE 104. In some other aspects, the resource configuration component 1440 may configure the set of DL resources to carry at least one CSI-RS—e.g., the UE 104 may be provided scheduling information indicating the at least one CSI-RS is allocated on the set of DL resources. The transmission component 1434 may be further configured to transmit, to the UE 104, at least one CSI-RS in the set of DL resources, e.g., as described in connection with 1308 of FIG. 13.

The reception component 1430 may be further configured to receive, from the UE 104, information indicating CSF based on the set of DL resources, e.g., as described in connection with 1310 of FIG. 13. In some aspects, the information indicating CSF includes at least a first CSF report that is based on interference cancellation by the UE 104, and a second CSF report that is based on absence of interference cancellation by the UE 104.

In some other aspects, the information indicating the CSF may be based on configuring the UE 104 for reporting of the CSI that is one of periodic, semi-persistent, or aperiodic.

The communication manager 1432 further may include a communication configuration component 1444 that configures communication with the UE 104 based on the information indicating the CSF, e.g., as described in connection with 1312 of FIG. 13. In some aspects, the information indicating the CSF may be further based on the at least one CSI-RS or may be based on the configuration of the set of DL resources as CSI-IM resources (e.g., the transmission component 1434 may refrain from transmitting any DL signals in the CSI-IM resources).

In some aspects, the information indicating CSF may include at least one of a CQI, PMI, and/or RI based on the set of DL resources. In some aspects, the at least one of the CQI, RI, or PMI may be associated with a wideband bandwidth. In some other aspects, the set of DL resources is divided a plurality of sub-bands, and the channel quality component 1244 may determine at least one of a plurality of CQI that is each associated with a respective one of the plurality of sub-bands, a plurality of RI that is each associated with a respective one of the plurality of sub-bands, and/or a plurality of PMI that is each associated with a respective one of the plurality of sub-bands. Each sub-band of the plurality of sub-bands may extend over a same number of RBs of the set of DL resources, or each sub-band of the plurality of sub-bands may extend over an increasingly greater number of RBs of the set of DL resources in proportion to a distance from the set of UL resources.

In some aspects, the communication configuration component 1444 may configure communication with the UE 104 further based on at least one ACLR. For example, each ACLR may corresponding to a respective transmission of an UL signal in a set of UL resources using a respective transmission configuration (e.g., configuring at least one of a transmission power, an UL bandwidth, and/or a waveform for transmission of an UL signal in UL resources).

In some aspects, the communication configuration component 1444 may determine (e.g., measure) at least one ACLR, e.g., based on transmission of at least one UL signal in at least one set of UL resources by the UE 104. In some other aspects, the reception component 1430 may receive the at least one ACLR from the UE 104, e.g., in association with transmission of at least one UL signal in at least one set of UL resources.

The apparatus may include additional components that perform each of the blocks of the algorithm in the aforementioned call flow diagrams and/or flowchart of FIGS. 6, 7, and 13. As such, each block in the aforementioned call flow diagrams and/or flowchart of FIGS. 6, 7, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for configuring a UE with a set of DL resources associated with CSI, the set of DL resources being adjacent to or at least partially overlapping with a set of UL resources. Further, the apparatus 1402, and in particular the baseband unit 1404, includes means for receiving, from the UE, information indicating CSF based on the set of DL resources. Further, the apparatus 1402, and in particular the baseband unit 1404, includes means for configuring communication with the UE based on the information indicating CSF.

In some aspects, the apparatus 1402, and in particular the baseband unit 1404, may further include means for receiving at least one UL signal from the UE in the set of UL resources, and the set of UL resources at least partially overlaps with the set of DL resources in a time domain and the set of DL resources is adjacent to or at least partially overlapping with the set of UL resources in a frequency domain.

In some aspects, the UL signal includes at least one of an SRS, a DM-RS, a signal associated with control information on a PUCCH, or a signal associated with data on a PUSCH.

In some aspects, the apparatus 1402, and in particular the baseband unit 1404, may further include means for transmitting, to the UE, a configuration for transmission of the UL signal, and the configuration includes at least one of a transmit power, an UL bandwidth, or a waveform.

In some aspects, the apparatus 1402, and in particular the baseband unit 1404, may further include means for transmitting, to the UE, an UL grant allocating the set of UL resources to the UE for transmission of the UL signal.

In some aspects, the apparatus 1402, and in particular the baseband unit 1404, may further include means for transmitting, to the UE, at least one CSI-RS in the set of DL resources, and the information indicating CSF is further based on the at least one CSI-RS.

In some aspects, the set of DL resources is allocated as CSI-IM resources, and the CSI-IM resources do not include any DL signals. In some aspects, the information indicating the CSF includes at least one of a CQI, an RI, or a PMI.

In some aspects, the set of DL resources includes a plurality of sub-bands, and the information indicating the CSF includes at least one of a plurality of CQI that is each associated with a respective one of the plurality of sub-bands, a plurality of RI that is each associated with a respective one of the plurality of sub-bands, or a plurality of PMI that is each associated with a respective one of the plurality of sub-bands. In some aspects, each sub-band of the plurality of sub-bands extends over a same number of RBs of the set of DL resources. In some aspects, each sub-band of the plurality of sub-bands extends over an increasingly greater number of RBs of the set of DL resources in proportion to a distance from the set of UL resources. In some aspects, the at least one of the CQI, the RI, or the PMI is associated is associated with a wideband bandwidth.

In some aspects, the apparatus 1402, and in particular the baseband unit 1404, may further include means for receiving, from the UE, information indicating at least one ACLR, and the communication with the UE is configured further based on the at least one ACLR.

In some aspects, the apparatus 1402, and in particular the baseband unit 1404, may further include means for configuring the UE for reporting of CSI that is one of periodic, semi-persistent, or aperiodic, and the information indicating the CSF is based on configuring the UE for reporting of the CSI that is one of periodic, semi-persistent, or aperiodic. In some aspects, the set of UL resources do not include any UL signals. In some aspects, the information indicating CSF includes at least a first CSF report that is based on interference cancellation by the UE, and a second CSF report that is based on absence of interference cancellation by the UE.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:

transmitting an uplink (UL) signal in a set of UL resources configured for the UE with a base station;

monitoring a set of downlink (DL) resources configured for the UE with the base station, the set of DL resources being adjacent to or at least partially overlapping with the set of UL resources;

determining a channel quality associated with the set of DL resources based on the UL signal transmitted in the set of UL resources; and transmitting, to the base station, information indicating channel state feedback (CSF) based on the determined channel quality and information indicating at least one adjacent channel leakage ratio (ACLR) associated with the information indicating CSF.

2. The method of claim 1, wherein the set of UL resources at least partially overlaps with the set of DL resources in a time domain, and the set of UL resources is adjacent to or at least partially overlapping with the set of DL resources in a frequency domain.

3. The method of claim 1, further comprising:

receiving at least one channel state information (CSI) reference signal (RS) in the set of DL resources, wherein the channel quality is determined further based on the at least one CSI-RS.

4. The method of claim 1, further comprising:

measuring energy on the set of DL resources concurrently with transmission of the UL signal, wherein the set of DL resources is allocated as channel state information (CSI) interference measurement (IM) resources, and the channel quality is determined further based on the energy measured on the set of DL resources concurrently with the transmission of the UL signal.

5. The method of claim 1, wherein the UL signal comprises at least one of a sounding reference signal (SRS), a demodulation reference signal (DM-RS), a signal associated with control information on a physical uplink control channel (PUCCH), or a signal associated with data on a physical uplink shared channel (PUSCH).

6. The method of claim 1, further comprising:

transmitting another UL signal in another set of UL resources with another configuration different from a first configuration with which the UL signal is transmitted in the set of UL resources, wherein the other configuration includes at least one of a transmit power, an UL bandwidth, or a waveform different from that included in the first configuration;

monitoring another set of DL resources configured with the base station, the other set of DL resources being adjacent to or at least partially overlapping with the other set of UL resources;

determining another channel quality associated with the other set of DL resources based on the other UL signal transmitted in the other set of UL resources; and transmitting, to the base station, other information indicating other CSF based on the other determined channel quality.

7. The method of claim 1, wherein the information indicating the CSF comprises at least one of a channel quality indicator (CQI), a rank indicator (RI), or a precoding matrix indicator (PMI).

8. The method of claim 7, wherein the set of DL resources comprises a plurality of sub-bands, and wherein the information indicating the CSF comprises at least one of a plurality of CQI that is each associated with a respective one of the plurality of sub-bands, a plurality of RI that is each associated with a respective one of the plurality of sub-bands, or a plurality of PMI that is each associated with a respective one of the plurality of sub-bands.

9. The method of claim 7, wherein the at least one of the CQI, RI, or PMI is associated with a wideband bandwidth.

10. The method of claim 1, wherein the information indicating CSF comprises at least a first CSF report that is based on interference cancellation, and a second CSF report that is based on absence of interference cancellation.

11. A method of wireless communication by a base station, comprising:

configuring a user equipment (UE) with a set of downlink (DL) resources associated with channel state information (CSI), the set of DL resources being adjacent to or at least partially overlapping with a set of uplink (UL) resources also configured for the UE;

receiving, from the UE, information indicating channel state feedback (CSF) based on the set of DL resources and information indicating at least one adjacent channel leakage ratio (ACLR) associated with the information indicating the CSF; and configuring communication with the UE based on the information indicating CSF, wherein the communication with the UE is configured further based on the at least one ACLR.

12. The method of claim 11, further comprising:

receiving at least one UL signal from the UE in the set of UL resources, wherein the set of UL resources at least partially overlaps with the set of DL resources in a time domain and the set of DL resources is adjacent to or at least partially overlapping with the set of UL resources in a frequency domain.

13. The method of claim 12, further comprising:

transmitting, to the UE, a configuration for transmission of the UL signal, wherein the configuration includes at least one of a transmit power, an UL bandwidth, or a waveform.

14. The method of claim 11, further comprising:

transmitting, to the UE, at least one channel state information (CSI) reference signal (RS) in the set of DL resources, wherein the information indicating CSF is further based on the at least one CSI-RS.

15. The method of claim 11, wherein the set of DL resources is allocated as channel state information (CSI) interference measurement (IM) resources, and the CSI-IM resources do not include any DL signals.

16. The method of claim 11, wherein the information indicating the CSF comprises at least one of a channel quality indicator (CQI), a rank indicator (RI), or a precoding matrix indicator (PMI).

17. The method of claim 16, wherein the set of DL resources comprises a plurality of sub-bands, and wherein the information indicating the CSF comprises at least one of a plurality of CQI that is each associated with a respective one of the plurality of sub-bands, a plurality of RI that is each associated with a respective one of the plurality of sub-bands, or a plurality of PMI that is each associated with a respective one of the plurality of sub-bands.

18. The method of claim 16, wherein the at least one of the CQI, the RI, or the PMI is associated is associated with a wideband bandwidth.

19. An apparatus for wireless communication by a user equipment (UE), comprising:

a transceiver;

a memory; and at least one processor coupled to the transceiver and the memory and configured to:

transmit, via the transceiver, an uplink (UL) signal in a set of UL resources configured for the UE with a base station;

monitor a set of downlink (DL) resources configured for the UE with the base station, the set of DL resources being adjacent to or at least partially overlapping with the set of UL resources;

determine a channel quality associated with the set of DL resources based on the UL signal transmitted in the set of UL resources; and transmit, via the transceiver to the base station, information indicating channel state feedback (CSF)

based on the determined channel quality and information indicating at least one adjacent channel leakage ratio (ACLR) associated with the information indicating CSF.

20. The apparatus of claim 19, wherein the set of UL resources at least partially overlaps with the set of DL resources in a time domain, and the set of UL resources is adjacent to or at least partially overlapping with the set of DL resources in a frequency domain.

21. The apparatus of claim 19, wherein the at least one processor is further configured to:

receive, via the transceiver, at least one channel state information (CSI) reference signal (RS) in the set of DL resources, wherein the channel quality is determined further based on the at least one CSI-RS.

22. The apparatus of claim 19, wherein the at least one processor is further configured to:

measure energy on the set of DL resources concurrently with transmission of the UL signal, wherein the set of DL resources is allocated as channel state information (CSI) interference measurement (IM) resources, and the channel quality is determined further based on the energy measured on the set of DL resources concurrently with the transmission of the UL signal.

23. The apparatus of claim 19, wherein the UL signal comprises at least one of a sounding reference signal (SRS), a demodulation reference signal (DM-RS), a signal associated with control information on a physical uplink control channel (PUCCH), or a signal associated with data on a physical uplink shared channel (PUSCH).

24. An apparatus for wireless communication by a base station, comprising:

a memory; and at least one processor coupled to the memory and configured to:

configure a user equipment (UE) with a set of downlink (DL) resources associated with channel state information (CSI), the set of DL resources being adjacent to or at least partially overlapping with a set of uplink (UL) resources also configured for the UE;

receive, from the UE, information indicating channel state feedback (CSF) based on the set of DL resources and information indicating at least one adjacent channel leakage ratio (ACLR) associated with the information indicating the CSF; and configure communication with the UE based on the information indicating CSF, wherein the communication with the UE is configured further based on the at least one ACLR.

25. The apparatus of claim 24, wherein the at least one processor is further configured to:

receive at least one UL signal from the UE in the set of UL resources, wherein the set of UL resources at least partially overlaps with the set of DL resources in a time domain and the set of DL resources is adjacent to or at least partially overlapping with the set of UL resources in a frequency domain.

26. The apparatus of claim 25, wherein the at least one processor is further configured to:

transmit, to the UE, a configuration for transmission of the UL signal, wherein the configuration includes at least one of a transmit power, an UL bandwidth, or a waveform.

27. The apparatus of claim 24, wherein the at least one processor is further configured to:

transmit, to the UE, at least one channel state information (CSI) reference signal (RS) in the set of DL resources, wherein the information indicating CSF is further based on the at least one CSI-RS.

28. The apparatus of claim 24, wherein the set of DL resources is allocated as channel state information (CSI) interference measurement (IM) resources, and the CSI-IM resources do not include any DL signals.

* * * * *